United States Patent
Kim et al.

(10) Patent No.: US 10,873,929 B2
(45) Date of Patent: Dec. 22, 2020

(54) METHOD AND USER EQUIPMENT FOR TRANSMITTING RANDOM ACCESS SIGNALS, AND METHOD AND BASE STATION FOR RECEIVING RANDOM ACCESS SIGNALS

(71) Applicant: LG Electronics Inc., Seoul (KR)

(72) Inventors: Eunsun Kim, Seoul (KR); Kijun Kim, Seoul (KR); Hyunsoo Ko, Seoul (KR); Suckchel Yang, Seoul (KR); Yunjung Yi, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/347,665

(22) PCT Filed: Nov. 6, 2017

(86) PCT No.: PCT/KR2017/012459
§ 371 (c)(1),
(2) Date: May 6, 2019

(87) PCT Pub. No.: WO2018/084662
PCT Pub. Date: May 11, 2018

(65) Prior Publication Data
US 2019/0320430 A1    Oct. 17, 2019

Related U.S. Application Data

(60) Provisional application No. 62/418,177, filed on Nov. 6, 2016, provisional application No. 62/441,575, filed
(Continued)

(51) Int. Cl.
*H04W 72/04* (2009.01)
*H04W 74/08* (2009.01)
*H04W 72/02* (2009.01)

(52) U.S. Cl.
CPC ..... *H04W 72/0413* (2013.01); *H04W 72/048* (2013.01); *H04W 72/0446* (2013.01); *H04W 74/0866* (2013.01); *H04W 72/02* (2013.01)

(58) Field of Classification Search
CPC ............. H04W 72/00; H04W 72/0413; H04W 72/044; H04W 72/0446; H04W 74/00;
(Continued)

(56) References Cited

U.S. PATENT DOCUMENTS

2016/0029358 A1   1/2016  Hou et al.
2018/0092064 A1*  3/2018  Ryu ....................... H04W 48/10
(Continued)

FOREIGN PATENT DOCUMENTS

WO    WO2018143762    *  9/2018  ............ H04W 74/00

OTHER PUBLICATIONS

R1-1612461:3GPP TSG RAN WG1 #87, Reno, USA, Nov. 14-18, 2016, Samsung, "RACH preamble format considering beam correspondence," pp. 1-4.
(Continued)

*Primary Examiner* — Warner Wong
(74) *Attorney, Agent, or Firm* — Dentons US LLP

(57) ABSTRACT

Disclosed herein are a method and apparatus for transmitting/receiving random access signals. A first random access channel (RACH) resource for a first RACH preamble format and a second RACH resource for a second RACH preamble format are configured, separately. The first RACH resource and the second RACH resource are for a UE at which Tx/Rx beam correspondence holds and for a UE at which Tx/Rx beam correspondence does not hold, respectively. A UE can use the first or second RACH resource, depending on whether or not Tx/Rx beam correspondence holds at the UE.

4 Claims, 12 Drawing Sheets

Related U.S. Application Data on Jan. 3, 2017, provisional application No. 62/466,285, filed on Mar. 2, 2017.

(58) Field of Classification Search
CPC ............. H04W 74/08; H04W 74/0808; H04W 74/0833; H04W 74/0866; H04W 74/0891; H04W 72/04; H04W 56/00; H04W 56/001; H04W 16/28; H04W 72/048; H04L 12/413

See application file for complete search history.

(56) References Cited

U.S. PATENT DOCUMENTS

| | | | | |
|---|---|---|---|---|
| 2018/0092129 | A1* | 3/2018 | Guo | H04W 56/0045 |
| 2018/0103492 | A1* | 4/2018 | Akkarakaran | H04W 72/00 |
| 2018/0167979 | A1* | 6/2018 | Guo | H04W 16/28 |
| 2018/0227898 | A1* | 8/2018 | Noh | H04B 7/088 |
| 2018/0332625 | A1* | 11/2018 | Tsai | H04B 7/0695 |
| 2019/0037605 | A1* | 1/2019 | Agiwal | H04W 74/0833 |
| 2019/0045457 | A1* | 2/2019 | Islam | H04W 52/36 |
| 2019/0045571 | A1* | 2/2019 | Wu | H04W 74/0833 |
| 2019/0059112 | A1* | 2/2019 | Ou | H04W 74/008 |
| 2019/0075600 | A1* | 3/2019 | Kwon | H04W 74/0833 |
| 2019/0132066 | A1* | 5/2019 | Park | H04W 36/0079 |
| 2019/0306875 | A1* | 10/2019 | Zhou | H04W 72/1284 |
| 2019/0320468 | A1* | 10/2019 | Svedman | H04W 74/0833 |
| 2019/0364542 | A1* | 11/2019 | Tang | H04W 72/042 |
| 2020/0037297 | A1* | 1/2020 | Pan | H04W 72/044 |
| 2020/0067581 | A1* | 2/2020 | Osawa | H04W 88/02 |
| 2020/0068616 | A1* | 2/2020 | Qian | H04W 74/0833 |
| 2020/0119899 | A1* | 4/2020 | Qin | H04B 7/06 |
| 2020/0128587 | A1* | 4/2020 | Qian | H04W 88/02 |
| 2020/0236704 | A1* | 7/2020 | Chande | H04W 72/005 |

OTHER PUBLICATIONS

R1-1612300:3GPP TSG-RAN WG1#87, Reno, U.S.A., Nov. 14-18, 2016, Nokia, Alcatel-Lucent Shanghai Bell, "PRACH Resource Configuration for Single-Beam and Multi-Beam," pp. 1-5.

R1-1612298: 3GPP TSG-RAN WG1#87, Reno, U.S.A., Nov. 14-18, 2016, Nokia, Alcatel-Lucent Shanghai Bell, "Impact of UE TX/RX Beam correspondence and non-correspondence," pp. 1-7.

R1-1612466:3GPP TSG RAN WG1 #87, Reno, USA Nov. 14-18, 2016, Samsung, "RA procedure with and without beam correspondence," pp. 1-5.

* cited by examiner

FIG. 12
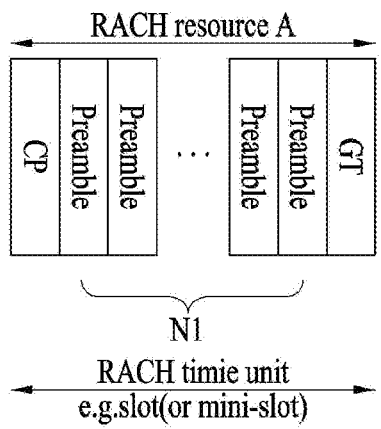
(a)
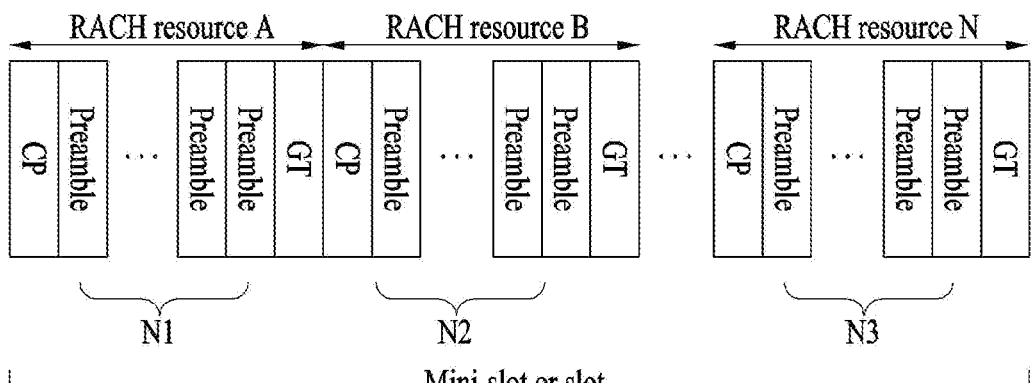
(b)
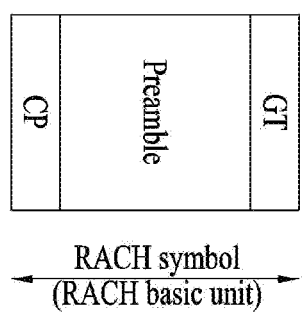
(c)

METHOD AND USER EQUIPMENT FOR TRANSMITTING RANDOM ACCESS SIGNALS, AND METHOD AND BASE STATION FOR RECEIVING RANDOM ACCESS SIGNALS

This application is a National Stage Entry of International Application No. PCT/KR2017/012459 filed Nov. 6, 2017, which claims priority to U.S. Provisional Application Nos. 62/418,177 filed Nov. 6, 2016; 62/441,575 filed Jan. 3, 2017 and 62/466,285 filed Mar. 2, 2017, all of which are incorporated herein by reference.

TECHNICAL FIELD

The present invention relates to a wireless communication system, and more particularly, to a method and apparatus for transmitting/receiving random access signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more and more communication devices require greater communication capacity, there is a need for improved mobile broadband communication over legacy radio access technology (RAT). In addition, massive machine type communication (mMTC) for connecting multiple devices and objects to each other to provide various services anytime and anywhere is one of the major issues to be considered in next generation communication.

There is also a discussion on communication systems to be designed in consideration of reliability and latency-sensitive services/UEs. Introduction of next generation radio access technology is being discussed in terms of improved mobile broadband communication (eMBB), mMTC, and ultra-reliable and low latency communication (URLLC).

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a system for transmitting/receiving signals in a system supporting a new radio access technology is required.

The technical objects that can be achieved through the present invention are not limited to what has been particularly described hereinabove and other technical objects not described herein will be more clearly understood by persons skilled in the art from the following detailed description.

Technical Solution

Disclosed herein are a method and apparatus for transmitting/receiving random access signals.

A first random access channel (RACH) resource for a first RACH preamble format and a second RACH resource for a second RACH preamble format are configured, separately. The first RACH resource and the second RACH resource are for a UE at which Tx/Rx beam correspondence holds and for a UE at which Tx/Rx beam correspondence does not hold, respectively. A UE can use the first or second RACH resource, depending on whether or not Tx/Rx beam correspondence holds at the UE.

The object of the present invention can be achieved by providing a method for transmitting random access signals by a user equipment (UE). The method comprises: receiving, by the UE, configuration information of a first random access channel (RACH) resource for a first RACH preamble format and configuration information of a second RACH resource for a second RACH preamble format; and transmitting, by the UE, a physical RACH (PRACH) with the first RACH preamble format on the first RACH resource or with the second RACH preamble format on the second RACH resource. The UE transmits the PRACH with the first RACH preamble format on the first RACH resource if transmission (Tx) and reception (Rx) (Tx/Rx) beam correspondence holds at the UE, and the UE transmits the PRACH with second RACH preamble format on the second RACH resource if Tx/Rx beam correspondence does not hold at the UE.

In another aspect of the present invention, provided herein is a method for receiving random access signals by a base station (BS). The method comprises: transmitting, by the BS, configuration information of a first random access channel (RACH) resource for a first RACH preamble format and configuration information of a second RACH resource for a second RACH preamble format; and receiving, by the UE, a physical RACH (PRACH) with the first RACH preamble format on the first RACH resource or with the second RACH preamble format on the second RACH resource from a user equipment (UE). The BS receives the PRACH with the first RACH preamble format on the first RACH resource if transmission (Tx) and reception (Rx) (Tx/Rx) beam correspondence holds at the UE, and the BS receives the PRACH with second RACH preamble format on the second RACH resource if Tx/Rx beam correspondence does not hold at the UE.

In another aspect of the present invention, provided herein is a user equipment (UE) for transmitting random access signals. The UE includes a radio frequency (RF) unit, and a processor configured to control the RF unit. The processor is configured to: control the RF unit to receive configuration information of a first random access channel (RACH) resource for a first RACH preamble format and configuration information of a second RACH resource for a second RACH preamble format; and control the RF unit to transmit a physical RACH (PRACH) with the first RACH preamble format on the first RACH resource or with the second RACH preamble format on the second RACH resource. The processor is configured to control the RF unit to transmit the PRACH with the first RACH preamble format on the first RACH resource if transmission (Tx) and reception (Rx) (Tx/Rx) beam correspondence holds at the UE, and the processor is configured to control the RF unit to transmit the PRACH with second RACH preamble format on the second RACH resource if Tx/Rx beam correspondence does not hold at the UE.

In another aspect of the present invention, provided herein is a base station (BS) for receiving random access signals. The BS includes a radio frequency (RF) unit, and a processor configured to control the RF unit. The processor is configured to: control the RF unit to transmit configuration information of a first random access channel (RACH) resource for a first RACH preamble format and configuration information of a second RACH resource for a second RACH preamble format; and control the RF unit to receive a physical RACH (PRACH) with the first RACH preamble format on the first RACH resource or with the second RACH preamble format on the second RACH resource from a user equipment (UE). The processor is configured to control the RF unit to receive the PRACH with the first RACH preamble format on the first RACH resource if transmission (Tx) and reception (Rx) (Tx/Rx) beam correspondence holds at the UE, and the processor is configured to control the RF unit to receive the PRACH with second RACH preamble format on the second RACH resource if Tx/Rx beam correspondence does not hold at the UE.

In each aspect of the present invention, the UE may transmit the PRACH with the first RACH preamble format on the first RACH resource one time before a random access response (RAR) window if Tx/Rx beam correspondence holds at the UE. The UE may transmit the PRACH with the second RACH preamble format on the second RACH resource multiple times before the RAR window if Tx/Rx beam correspondence does not hold at the UE.

In each aspect of the present invention, the UE may transmit the PRACH with the second RACH preamble format multiple times by changing Tx beam directions of the UE on the second RACH resource if Tx/Rx beam correspondence does not hold at the UE.

In each aspect of the present invention, the first or second RACH preamble format may have a single preamble sequence, and at least one of a cyclic prefix preceding the single preamble sequence or a guard time following the single preamble sequence.

In each aspect of the present invention, the first or second RACH preamble format may have multiple consecutive preamble sequences, and at least one of a cyclic prefix preceding the multiple consecutive preamble sequences or a guard time following the multiple consecutive preamble sequences.

In each aspect of the present invention, the BS may attempt. to receive the PRACH with one Rx beam direction if Tx/Rx beam correspondence holds at a transmission and reception point (TRP) of the BS. The BS may attempt to receive the PRACH by changing Rx beam directions if Tx/Rx beam correspondence holds at a transmission and reception point (TRP) of the BS.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to one embodiment of the present invention, a low cost/complexity UE can perform communication with a BS at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a base station may be reduce.

In addition, with development of smart devices, a small amount of data or data which are less frequently generated may be efficiently transmitted/received.

Signals may be transmitted/received in a system supporting a new radio access technology.

According to an embodiment of the present invention, a small amount of data may be efficiently transmitted/received. It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 12 illustrates examples of PRACH preamble formats according to the present invention.

MODE FOR INVENTION

Figure 1:
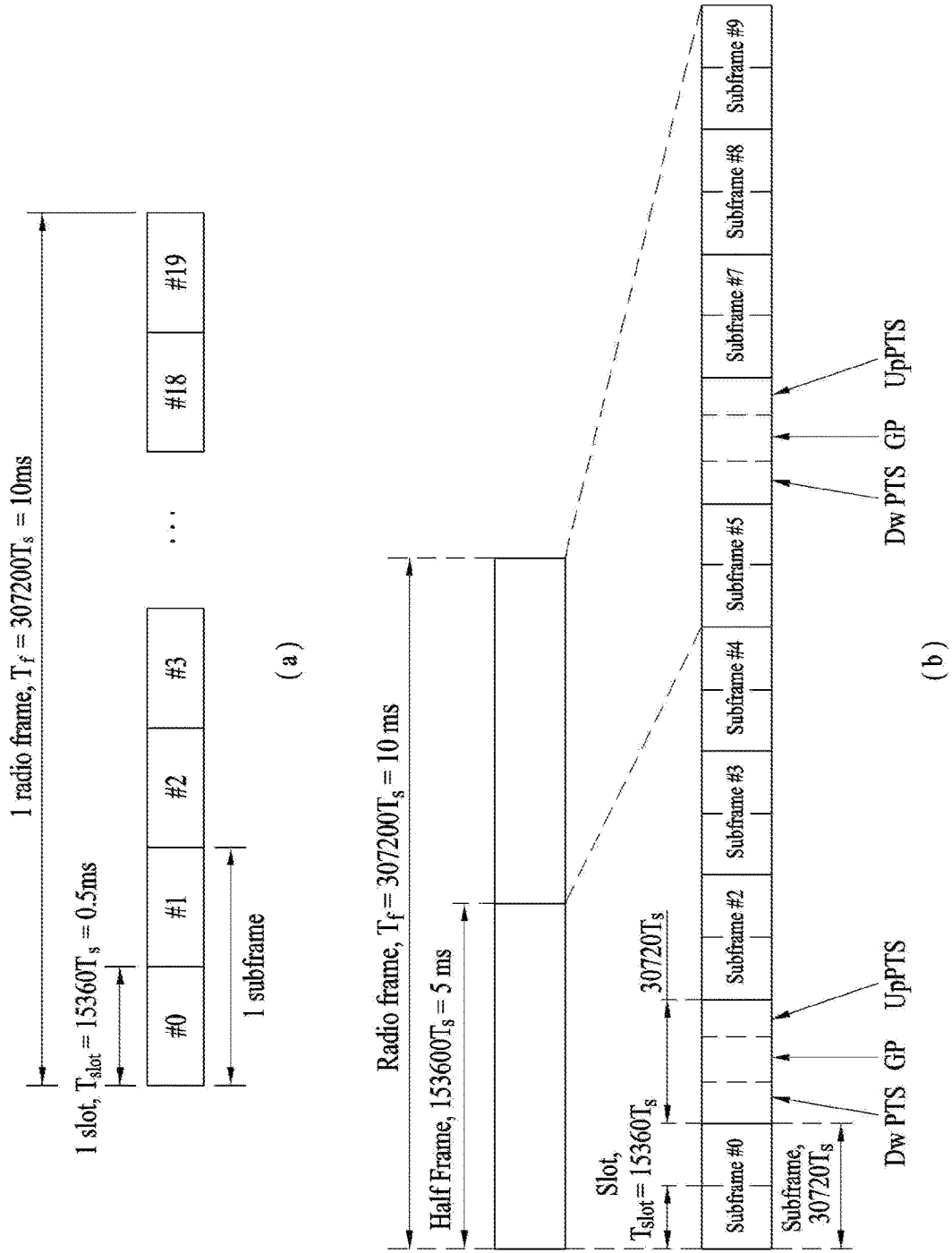
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, puncturing a channel on a specific resource means that the signal of the channel is mapped to the specific resource in the procedure of resource mapping of the channel, but a portion of the signal mapped to the punctured resource is excluded in transmitting the channel In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel The receiver of the channel receives, demodulates, or decodes the channel, assuming that the specific rate-matched resource is not used for mapping and transmission of the channel In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. The BS in UTRAN is referred to as a node-B (NB), and the BS in E-UTRAN is referred to as an eNB. The BS in the new RAT is referred to as a gNB. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For the terms and techniques which are used hererin but not specifically described, the 3GPP LTE/LTE-A standard documents, for example, 3GPP TS 36.211, 3GPP TS 36.212, 3GPP TS 36.213, 3GPP TS 36.300, 3GPP TS 36.321 and 3GPP TS 36.331, and the like may be referenced.

FIG. 1 illustrates the structure of a radio frame used in a LTE/LTE-A based wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

TTI refers to an interval during which data may be scheduled. For example, referring to FIGS. 1 and 3, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1ms.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
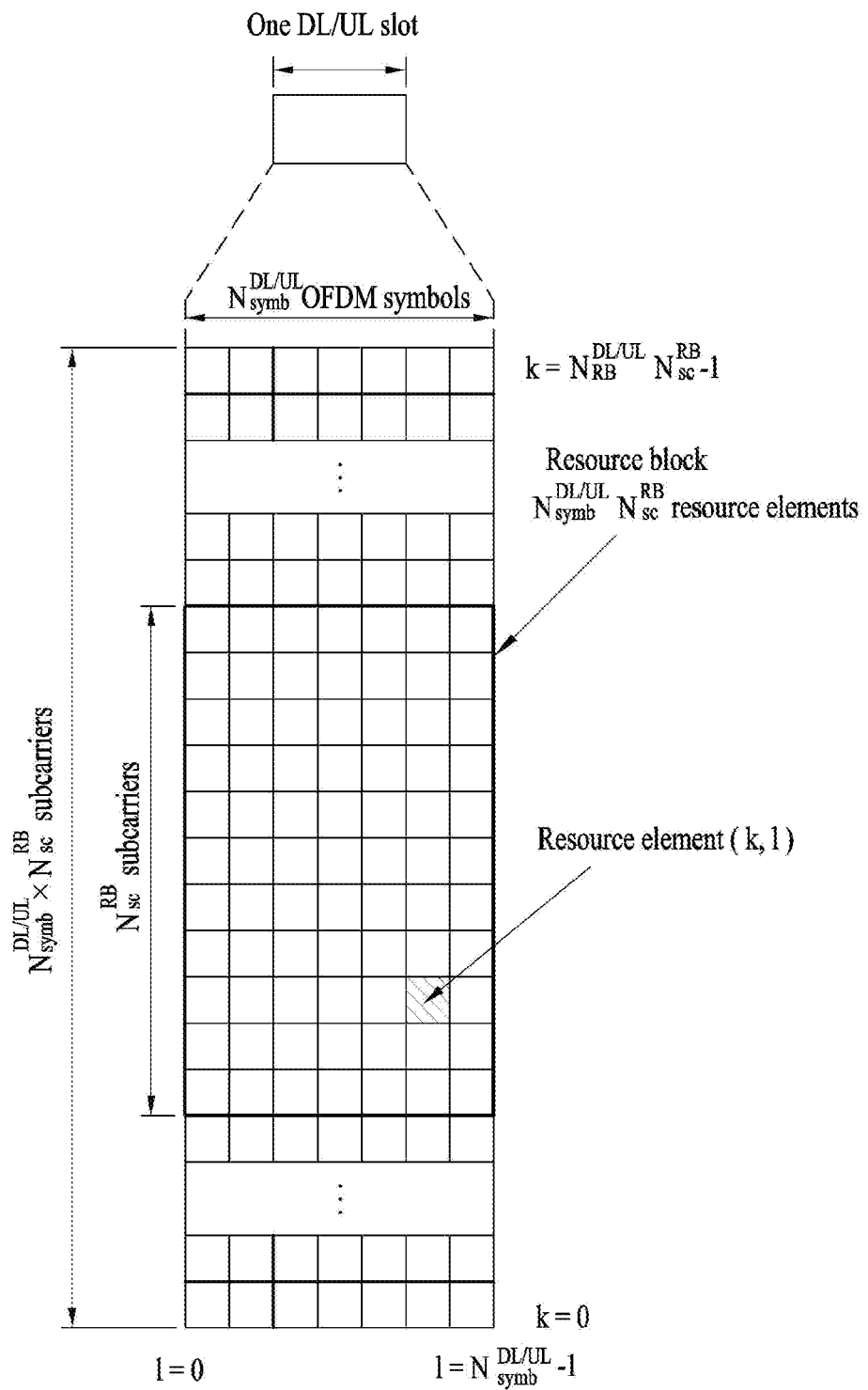
FIG. 2 illustrates the structure of a downlink (DL)/uplink (UL) slot in a wireless communication system.

FIG. 2 illustrates the structure of a DL/UL slot structure in a LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{DL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency fo in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, 1) within one slot. k is an index ranging from 0 to $N^{DL/UL}_{RB}*N^{RB}_{sc}-1$ in the frequency domain, and 1 is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
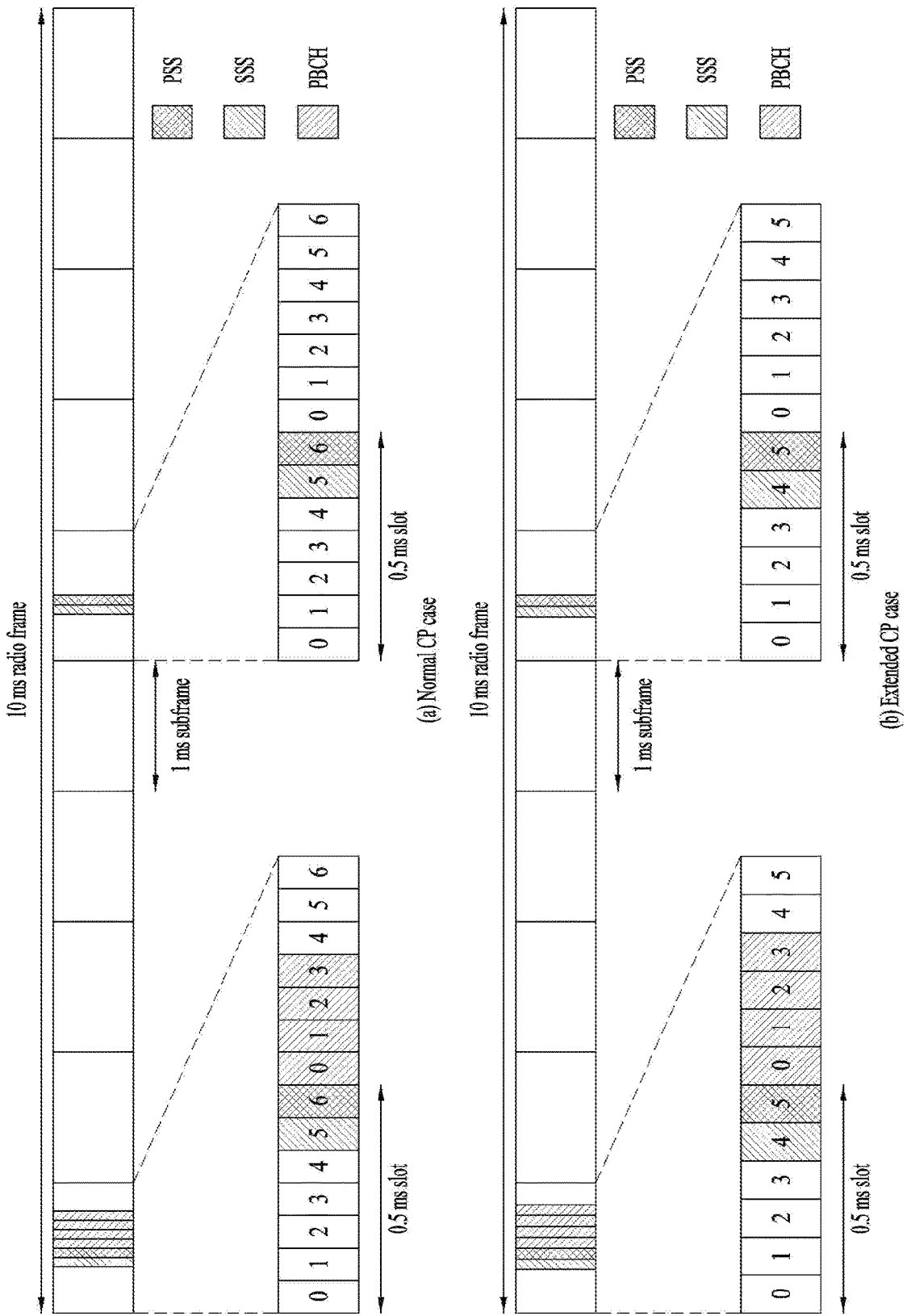
FIG. 3 illustrates a radio frame structure for transmission of a synchronization signal (SS) in a LTE/LTE-A based wireless communication system.

FIG. 3 illustrates a radio frame structure for transmission of a synchronization signal (SS) in a LTE/LTE-A based wireless communication system. Specifically, FIG. 3 illustrates a radio frame structure for transmission of an SS and a PBCH in frequency division duplex (FDD), wherein FIG. 3(*a*) illustrates transmission locations of an SS and a PBCH in a radio frame configured as a normal cyclic prefix (CP) and FIG. 3(*b*) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

Upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

The UE, which has determined time and frequency parameters necessary for demodulating a DL signal and transmitting a UL signal at an accurate time by performing a cell search procedure using PSS/SSS, can communicate with the eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB 1), SIB Type 2 (SIB2), and SIB3 to SIB17 in accordance with the parameters.

The MIB includes most frequently transmitted parameters which are essential for initial access of the UE to a network of the eNB. The UE may receive the MIB through a broadcast channel (e.g. PBCH). The MIB includes a DL bandwidth (BW), PHICH configuration, and a system frame number (SFN). Accordingly, the UE may be explicitly aware of information about the DL BW, SFN, and PHICH configuration by receiving the MIB. Meanwhile, information which may be implicitly recognized by the UE through reception of the PBCH includes the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The SIB1 includes parameters needed to determine if a specific cell is suitable for cell selection, as well as information about time-domain scheduling of the other SIBs. The SIB1 is received by the UE through broadcast signaling or dedicated signaling.

DL carrier frequency and corresponding system bandwidth may be acquired by the MIB carried by the PBCH. UL carrier frequency and corresponding system bandwidth may be acquired by system information which is a DL signal. The UE which has received the MIB applies a DL BW value within the MIB to a UL-bandwidth (UL BW) until system information block type 2 (SystemInformationBlockType2, SIB2) is received if there is no valid system information stored in a corresponding cell. For example, the UE may identify a full UL system band, which may be used by itself for UL transmission, through UL-carrier frequency and UL-bandwidth information within the SIB2 by acquiring system information block type 2 (SystemInformationBlockType2, SIB2).

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

The contention-based random access procedure has the following four steps. Hereinafter, messages transmitted in steps 1 to 4 may be respectively referred to as Msg1 to Msg4.

Step 1: RACH preamble (via PRACH) (UE to eNB)
Step 2: Random access response (RAR) (via PDCCH and PDSCH) (eNB to UE)
Step 3: Layer 2/Layer 3 message (via PUSCH) (UE to eNB)
Step 4: Contention resolution message (eNB to UE)

The dedicated random access procedure includes the following three steps. Hereinafter, uplink transmission (i.e. step 3) corresponding to a RAR may be performed as a part of the random access procedure. The dedicated random access procedure can be triggered using a PDCCH (hereinafter, referred to as PDCCH order) used for an eNB to command RACH preamble transmission.

Step 0: PACH preamble allocation through dedicated signaling (eNB to UE)
Step 1: RACH preamble (via PRACH) (UE to eNB)
Step 2: RAR (via PDCCH and PDSCH) (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc.

The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg3 after transmission of Msg3.

The physical layer random access preamble, consists of a cyclic prefix of length $T_{CP}$ and a sequence part of length $T_{SEQ}$. The parameter values are listed in Table 1 and depend on the frame structure and the random access configuration. Higher layers (e.g. RRC) control the preamble format.

TABLE 1

| Preamble format | $T_{CP}$ | $T_{SEQ}$ |
|---|---|---|
| 0 | $3168 \cdot T_s$ | $2 \cdot 24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (see Note) | $448 \cdot T_s$ | $4096 \cdot T_s$ |

NOTE:
Frame structure type 2 and special subframe configurations with UpPTS lengths $4380 \cdot T_s$ and $5120 \cdot T_s$ only.

The transmission of a random access preamble, if triggered by the MAC layer, is restricted to certain time and frequency resources. These resources are enumerated in increasing order of the subframe number within the radio frame and the physical resource blocks in the frequency domain such that index 0 correspond to the lowest numbered physical resource block and subframe within the radio frame. For frame structure type 1 with preamble format 0-3, there is at most one random access resource per subframe. For frame structure type 2 with preamble formats 0-4, there might be multiple random access resources in an UL subframe (or UpPTS for preamble format 4) depending on the UL/DL configuration.

Figure 4:
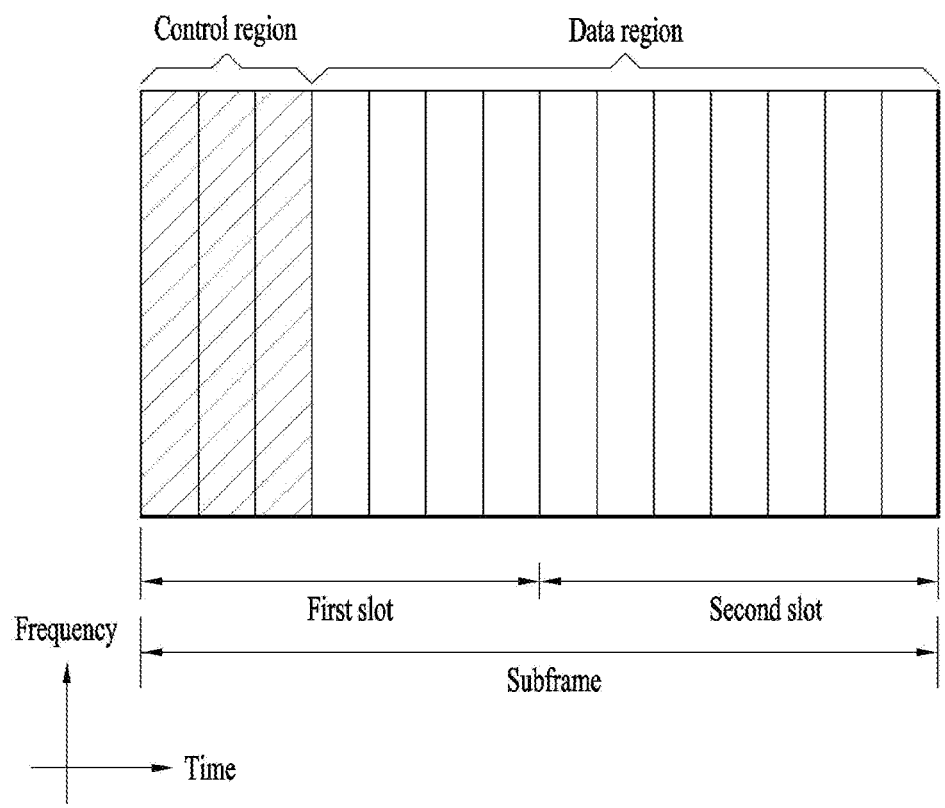
FIG. 4 illustrates the structure of a DL subframe used in a wireless communication system.

FIG. 4 illustrates the structure of a DL subframe used in a LTE/LTE-A based wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE/LTE-A include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH carries a control format indicator (CFI), which indicates any one of values of 1 to 3. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode. The UE may decode a PDSCH in accordance with DCI based on the DCI format successfully decoded. A transmission mode is semi-statically configured for the UE by the upper layer such that the UE may receive PDSCHs transmitted according to one of a plurality of predetermined transmission modes. The UE attempts to decode the PDCCH only in DCI formats corresponding to the transmission mode thereof. For example, tries to decode PDCCH candidates of a UE-specific search space (USS) to a fallback DCI (e.g., DCI format 1A), and tries to decode PDCCH candidates of a common search space (CSS) and the USS to a DCI format specific to a transmission mode with which the UE is configured. In other words, in order to maintain the computational load of the UE according to blind decoding attempts below a certain level, not all DCI formats are simultaneously searched by the UE.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}$-1, where $N_{CCE}$=floor($N_{REG}$/9). The control region of each serving cell consists of a set of CCEs, numbered from 0 to $N_{CCE,k}$-1, where $N_{CCE,k}$ is the total number of CCEs in the control region of subframe k. A PDCCH consisting of n consecutive CCEs may only start on a CCE fulfilling i mod n=0, where i is the CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level L{1,2,4,8} is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 5:
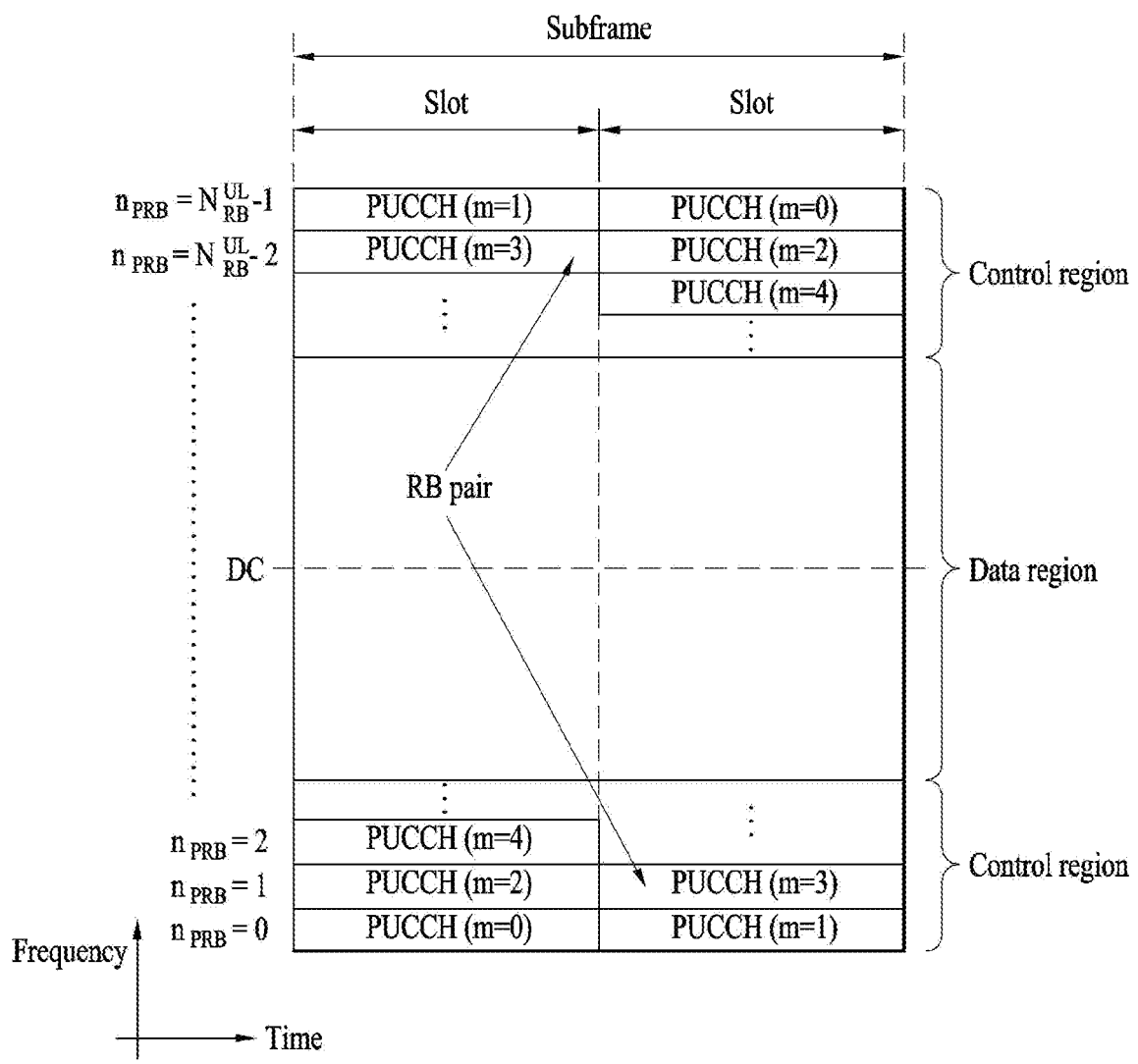
FIG. 5 illustrates the structure of a UL subframe used in a wireless communication system.

FIG. 5 illustrates the structure of a UL subframe used in a LTE/LTE-A based wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH)

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs), or multiple sub-bands for MTC may be provided in one subframe to multiplex MTC UEs in the subframe such that the UEs use different sub-bands or use the same sub-band which is not a sub-band consisting of the 6 center PRBs.

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE.As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy PDCCH/EPDCCH, may be introduced for the MTC UE.

A data channel (e.g., PDSCH, PUSCH) and/or control channel (e.g., M-PDCCH, PUCCH, PHICH) may be transmitted across multiple subframes to implement coverage enhancement (CE) of the UE, using a repetition technique or TTI bundling technique. On behalf of the CE, a control/data channel may be transmitted additionally using techniques such as cross-subframe channel estimation and frequency (narrowband) hopping. Herein, the cross-subframe channel estimation refers to a channel estimation technique using not only a reference signal in a subframe having a corresponding channel but also a reference signal in neighboring subframe(s).

The MTC UE may need CE up to, for example, 15 dB. However, not all MTC UEs are present in an environment which requires CE. In addition, the QoS requirements for MTC UEs are not identical. For example, devices such as a sensor and a meter have a low mobility and a small amount of data to transmit/receive and are very likely to be positioned in a shaded area. Accordingly, such devices may need high CE. On the other hand, wearable devices such as a smart watch may have mobility and are very likely to have a relatively large amount of data to transmit/receive and to be positioned in a place other than the shaded area. Accordingly, not all MTC UEs need a high level of CE, and the required capability may depend on the type of an MTC UE.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 6:
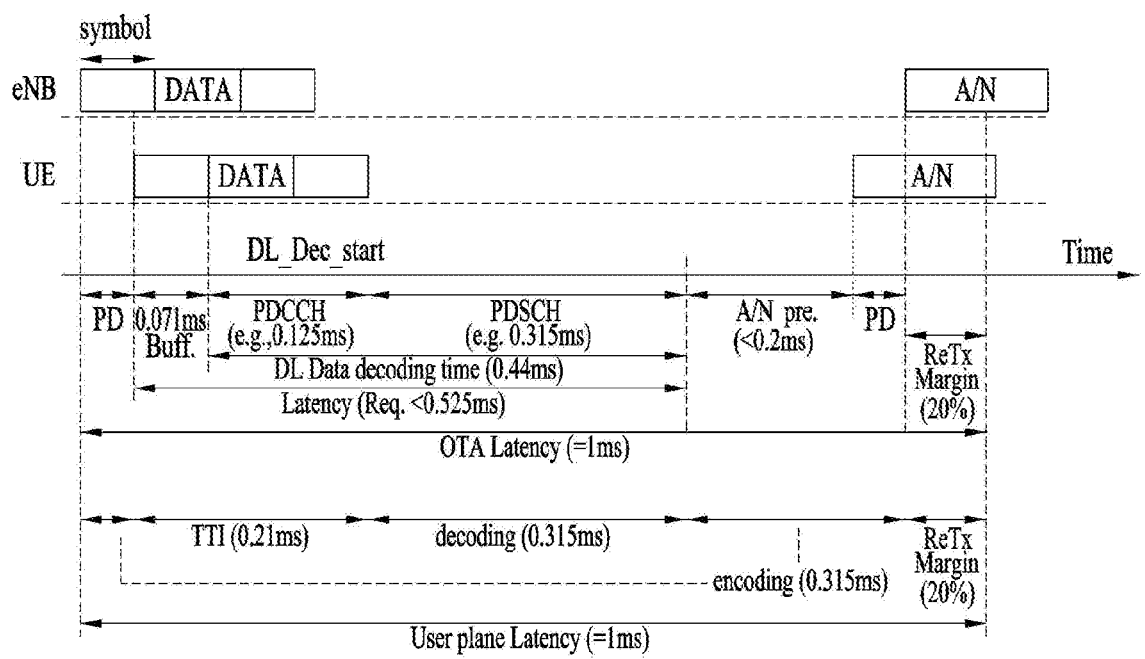
FIG. 6 illustrates the length of a transmission time interval (TTI) which is needed to implement low latency.

FIG. 6 illustrates the length of a transmission time interval (TTI) which is needed to implement low latency.

Referring to FIG. 6, a propagation delay (PD), a buffering time, a decoding time, an A/N preparation time, an uplink PD, and an OTA (over the air) delay according to a retransmission margin are produced while a signal transmitted from the eNB reaches the UE, the UE transmits an A/N for the signal, and the A/N reaches the eNB. To satisfy low latency, a shortened TTI (sTTI) shorter than or equal to 0.5 ms needs to be designed by shortening the TTI, which is the smallest unit of data transmission. For example, to shorten the OTA delay, which is a time taken from the moment the eNB starts to transmit data (PDCCH and PDSCH) until the UE completes transmission of an A/N for the data to the eNB, to a time shorter than 1 ms, the TTI is preferably set to 0.21 ms. That is, to shorten the user plane (U-plane) delay to 1 ms, the sTTI may be set in the unit of about three OFDM symbols.

While FIG. 6 illustrates that the sTTI is configured with three OFDM symbols to satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI, namely the channel band or system band of the TTI. In contrast with the legacy LTE/LTE-A system, in which the length of a TTI is fixed to 1 ms, and thus all UEs and eNB perform signal transmission and reception in units of 1 ms, the present invention supports a system which has multiple TTI lengths, and one UE and one eNB may transmit and receive a signal using multiple TTI lengths. In particular, the present invention proposes a method of enabling the eNB and UE to communicate with each other while supporting various TTI lengths and variability when the TTI length is variable and a method of performing multiplexing for each channel and UE. While description of the present invention below is based on the legacy LTE-/LTE-A system, it is also applicable to systems other than the LTE/LTE-A system or RAT.

Embodiments of the present invention described below may be applied to a new radio access technology (RAT) system in addition to the 3GPP LTE/LTE-A system. As more and more communication devices demand larger communication capacity, there is a need for improved mobile broadband communication compared to existing RAT. Also, massive MTC, which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC, and URLLC (Ultra-Reliable and Low Latency Communication), is being discussed. In the present invention, this technology is referred to as new RAT for simplicity.

<Self-Contained Subframe Structure>

Figure 7:
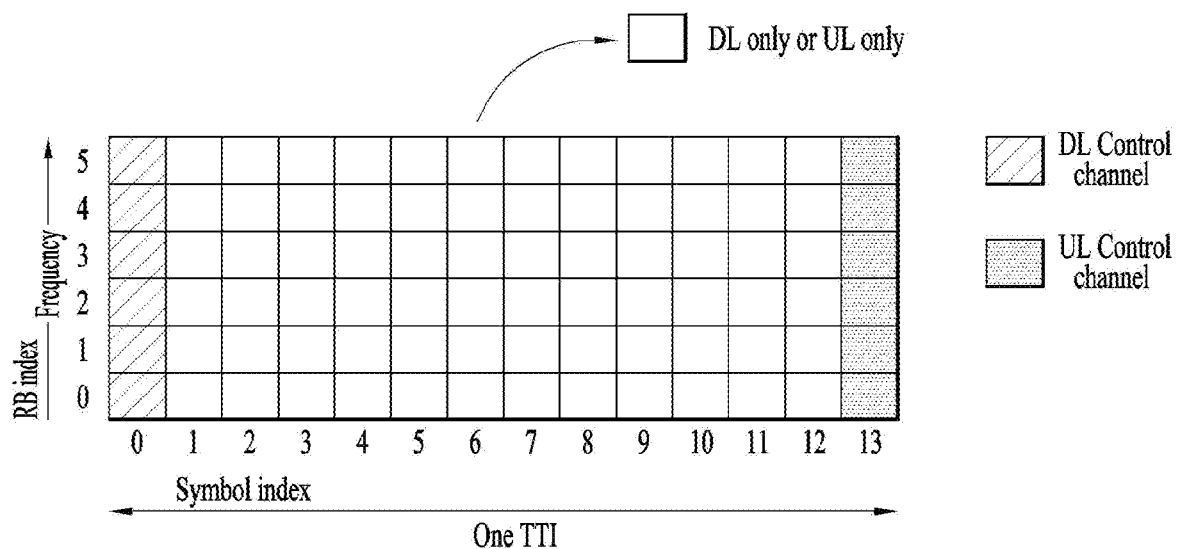
FIG. 7 illustrates a self-contained subframe structure.

FIG. 7 illustrates a self-contained subframe structure.

In order to minimize the latency of data transmission in the TDD system, a self-contained subframe structure is considered in the new fifth-generation RAT.

In FIG. 7, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 7, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

For example, a new RAT, referred to as mmWave and 5G, is expected to have a very large system bandwidth. Depending on the frequency band, 5 MHz, 10 MHz, 40 MHz, 80 MHz, etc. may have to be supported as minimum system bandwidth. The minimum system bandwidth may vary depending on the basic subcarrier spacing (i.e., default subcarrier spacing) of the system. For example, when the basic subcarrier spacing is 15 kHz, the minimum system bandwidth is 5 MHz. When the basic subcarrier spacing is 30 kHz, the minimum system bandwidth is 10 MHz. When the basic subcarrier spacing is 120 kHz, the minimum system bandwidth is 40 MHz. When the basic subcarrier spacing is 240 kHz, the minimum system bandwidth may be 80 MHz. The new RAT is designed for sub-6 GHz and bands higher than or equal to 6 GHz and is also designed to support multiple subcarriers within a system to support various scenarios and use cases. When the subcarrier length is changed, the subframe length is also correspondingly reduced/increased. For example, one subframe may be defined as a short time such as 0.5 ms, 0.25 ms, or 0.125 ms. Higher frequency bands (e.g., higher than 6 GHz) may be used in the new RAT system, and a subcarrier spacing wider than the existing subcarrier spacing of 15 kHz in the legacy LTE system is expected to be supported. For example, when the subcarrier spacing is 60 kHz, one resource unit (RU) may be defined by 12 subcarriers on the frequency axis and one subframe on the time axis. In the new RAT system, a plurality of subcarrier spacings (e.g., 15 kHz, 30 kHz, 60 kHz, 120 kHz and 240 kHz subcarrier spacing) which are an integer multiple (or an n-th power of 2) of a default subcarrier spacing may be used.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5 λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

Figure 8:
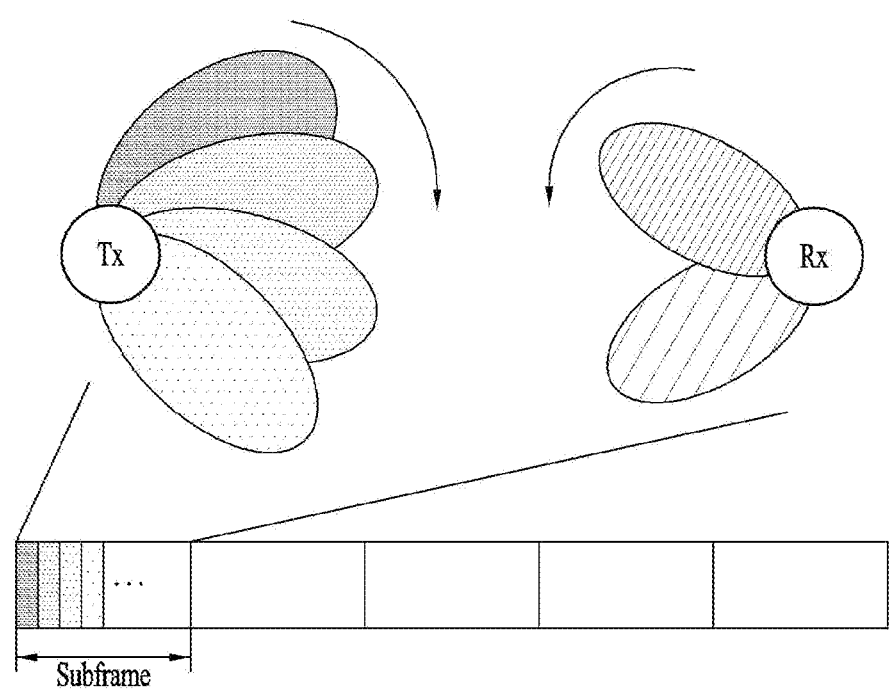
FIG. 8 illustrates an example of application of analog beamforming.

FIG. 8 illustrates an example of application of analog beamforming.

Referring to FIG. 8, a signal may be transmitted/received by changing the direction of a beam over time. While a non-UE-specific signal (e.g., PSS/SSS/PBCH/SI) is transmitted omni-directionally in the LTE/LTE-A system, a scheme in which an eNB employing mmWave transmits a cell-common signal by omni-directionally changing the beam direction is considered. Transmitting/receiving signals by rotating the beam direction as described above is referred to as beam sweeping or beam scanning. For example, assuming that the eNB can have a maximum of N beam directions, the eNB may transmit PSS/SSS/PBCH per each of the N beam directions. That is, the eNB transmits synchronization signals such as PSS/SSS/PBCH for each direction while sweeping beam directions that the eNB can have or support. Alternatively, when the eNB can form N beams, several beams may be bundled into one beam group, and PSS/SSS/PBCH may be transmitted/received per beam group. At this time, one beam group includes one or more beams. The bundle of PSS/SSS/PBCH for a beam group is called SS block. In terms of transmission of synchronous signals, an "SS block" is defined as a container for carrying PSS, SSS, PBCH and/or other system information in the NR. That is, the SS block is formed by a combination of the synchronization signals.

In the multiple beam environments, the repetition of the PRACH preamble or the beam sweep can be considered, depending on Tx/Rx reciprocal capability of the UE and/or the transmission and reception point (TRP) (e.g., gNB). The Tx/Rx reciprocal capability is also referred to as Tx/Rx beam correspondence at TRP and UE. If the Tx/Rx beam correspondence of TRP and/or UE is not maintained in multiple-beam environments, the UE may not be able to transmit the uplink signal in the direction of the beam that the UE itself received the downlink signal. This is because there is a possibility that the optimum path of UL and the optimum path of DL may be different. Tx/Rx beam correspondence at a TRP holds if at least one of the following is satisfied: the TRP is able to determine a TRP Rx beam for the uplink reception based on UE's downlink measurement on TRP's one or more Tx beams, and the TRP is able to determine a TRP Tx beam for the downlink transmission based on TRP's uplink measurement on TRP's one or more Rx beams. Tx/Rx beam correspondence at a UE holds if at least one of the following is satisfied: the UE is able to determine a UE Tx beam for the uplink transmission based on UE's downlink measurement on UE's one or more Rx beams, the UE is able to determine a UE Rx beam for the downlink reception based on TRP's indication based on uplink measurement on UE's one or more Tx beams, and capability indication of UE beam correspondence related information to a TRP is supported.

In the present invention, provided is a RACH procedure considering Tx/Rx beam reciprocity at TRP and UE, i.e., Tx/Rx beam correspondence at TRP and UE. In the present invention, an initial access procedure in mmWave, which is different from that of the legacy LTE system due to the characteristics of the analog beamforming, is proposed first. Further proposed are the operations of the UE and the eNB, and a method for signaling information between the UE and the eNB.

As mentioned before, FIG. 7 illustrates a subframe structure where a DL control channel is time division multiplexed with DL data or UL data onto a wideband. Referring to FIG.

7, a DL control channel on a wide band may be transmitted by time division multiplexing (TDM) with DL data or UL data. The eNB may transmit the DL control channel(s) over the entire band, but a UE may receive a DL control channel thereof in a specific band rather than the entire band. Here, the DL control channel refers to control information, which includes not only DL specific information such as DL scheduling but also information on cell configuration that the UE should know and UL specific information such as UL grant, transmitted from the eNB to the UE.

In order for a UE to make association with a specific system and receive a service from the specific system, the first operation that the UE has to perform is to obtain the time and frequency synchronization of the specific system, receive basic system information, and adjust uplink timing. This is generally called an initial access procedure. The initial access procedure generally includes a synchronization procedure and a RACH procedure. In the legacy LTE system, the synchronization procedure using PSS, SSS and PBCH may be summarized as follows:

>PSS: symbol timing acquisition, frequency synchronization, cell ID detection within cell ID group (3 hypotheses);

>SSS: cell ID group detection (168hypotheses), 10 ms frame boundary detection, CP detection (2 hypotheses);

>PBCH decoding: antenna configuration, 40 ms timing detection, system information, system bandwidth etc.

In other words, a UE acquires OFDM symbol timing and subfame timing by using PSS and SSS on a cell, and also obtain a cell ID of the cell by using the PSS and the PSS, and acquires system information important to the corresponding system by descrambling PBCH of the cell based on the cell ID and decoding the descrambled PBCH.

<Tx/Rx Reciprocity>

In multiple beam operation, RACH resource should be assigned based on TRP's receiving beam direction since TRP expects PRACH preamble reception on the RACH resource with a specific receiving beam direction. If TRP holds Tx/Rx reciprocity (i.e., Tx/Rx beam correspondence), the RACH resource becomes associated with TRP's transmission beam direction. However, in a UE's PRACH preamble transmission perspective, the RACH resource should be tied with the DL transmission beam direction. Hereinafter, the term "beam sweeping" indicates the transmitter side behaviour (transmitting), and the term "beam scanning" indicates the receiver side behaviour (receiving). There are four cases according to whether or not Tx/Rx reciprocity holds at TRP or UE.

Case 1: Tx/Rx Reciprocity Holds at both of TRP and UE

In this case, additional handling of beam alignments between a TRP and a UE is not required, but the UE determines its Tx/Rx beam based on the measurement on the DL broadcast signal beam sweeping. Beam scanning operation is conducted at the UE on the DL beam swept broadcast channel/signal, and the UE determines best received beam direction based on the DL measurement. If Tx/Rx reciprocity holds at the UE, the UE is able to determine its transmission beam direction based on the received beam. Hence, UE attempts PRACH preamble transmission with the same or similar direction as the best received signal/channel on a RACH resource associated with the beam direction.

With the assumption that Tx/Rx reciprocity holds at both TRP and UE, the UE may report the best received beam direction based on the best received DL measurement quality, and the TRP can easily determine the UE's receiving beam direction. Similarly, the UE can decide its best transmission beam direction based on the received DL measurement.

RACH resource can be defined per beam or beam group, and the UE chooses its RACH resource(s) to transmit PRACH preamble based on the DL received power. UE attempts PRACH preamble transmission on the RACH resource associated with the best received beam (or suitable beam) and waits RAR reception within a RAR reception window from a network with the same direction that the UE has transmitted the PRACH preamble. Based on the RAR, UE transmits Msg3 on the indicated time/frequency resource. Best beam indices information may be included in the Msg3. Msg4 from the network is transmitted with the same beam direction as that of Msg3 arrived at the TRP, and the Msg 4 may confirm which beam indices the UE use.

With Tx/Rx reciprocity at TRP and UE, beam specific RACH procedure and beam management would be much simpler than the case when Tx/Rx reciprocity at TRP or UE does not hold.

Case 2: Tx/Rx Reciprocity Does not Hold at UE side but it Holds at TRP Side

In this case, a TRP can determine its uplink receiving beam based on the UE's DL signal measurement but a UE is not able to determine its transmission beam for uplink based on the DL measurement on the DL broadcast signal. In other words, the TRP is able to decide its receiving beam based on DL measurement but the UE is not able to determine its UL transmission beam. Therefore, the UE needs to beam sweep its UL transmission so that a TRP receiver determines the best received direction(s) from the UE and signals the best UL transmission beam directions(s) of the UE. Based on the signaling of UL beam (direction) information, i.e., information indicating from which beam direction the TRP can hear with best performance, the UE determines its best UL transmission beam direction on the RACH resource afterwards (e.g. RACH Msg3).

Since Tx/Rx reciprocity is available at a TRP, PRACH resource (i.e., RACH resource) is associated with DL broadcast signal beam direction. In other words, if a PRACH resource is associated with a specific DL beam index/direction (e.g., B1), TRP tunes its receiving beams to B1 to receive PRACH preamble on the PRACH resource associated with the DL beam direction B1. With the TRP Rx beam fixed at each PRACH resource correspondingly, a UE transmits PRACH preamble with beam sweeping manner, and the TRP informs the UE of the best receiving beam direction(s) at TRP side. The best receiving beam direction(s) at TRP side becomes the UE's transmission beam direction(s) when the TRP fixes its receiving beam direction with a specific direction. UE's PRACH preamble beam sweeping should be performed on the PRACH resource to which the UE's best DL receiving beam direction (i.e. TRP's best transmission direction toward the UE) is tied.

Case 3: Tx/Rx Reciprocity does not Hold at TRP side but it Holds at UE Side

In this case, a TRP is not able to determine its uplink receiving beam based on the UE's DL signal measurement, while a UE is able to determine its uplink transmission beam direction based on DL signal measurement. Hence, strictly speaking, a RACH resource cannot be associated with the DL transmission signal beam direction, but it should be associated with receiving beam direction at the TRP. However, a UE transmitting a PRACH preamble has to know on which time-frequency resource (RACH resource) the PRACH preamble should be transmitted. Therefore, the RACH resource has to be associated with a DL transmission signal and a DL transmission direction.

TRP's best transmission beam towards a specific UE can be informed by the UE based on the DL measurement at the UE side, and the TRP needs to scan PRACH preamble with different receiving beam directions from the UE in order to determine the TRP's best receiving beam direction. In order for the TRP to determine receiving beam direction with beam scanning, PRACH preamble repetition with a transmission beam direction determined at a UE side can be considered. UE's PRACH preamble transmission beam is based on the DL measurement, which is determined by the UE. The TRP scans its best receiving direction(s) at the TRP side. Based on the UL measurement, the TRP determines its receiving beam direction at each RACH resource for each PRACH transmission from UEs. For the TRP's beam scanning, the PRACH preamble repetition is required at the UE.

Case 4 : Tx/Rx Reciprocity does not Hold at both of TRP and UE

In this case, beam sweeping and beam scanning at both TRP and UE sides are required to determine Tx/Rx beam at both sides. TRP's best transmission direction towards a specific UE is informed by the UE based DL measurement. UE's best transmission direction toward the TRP and the TRP's best receiving direction can be determined based on the beam sweeping of UL transmission. To decide UE's transmission beam direction, the UE has to transmit PRACH preamble with beam sweeping manner, and the TRP should perform beam scanning for each beam direction during UE beam sweeping.

Common Framework for RACH Procedure with/without Tx/Rx Reciprocity

In the following, it is discussed how to implement the beam sweeping and beam scanning procedure during a RACH procedure in terms of a RACH resource and a RACH preamble transmission.

Figure 9:
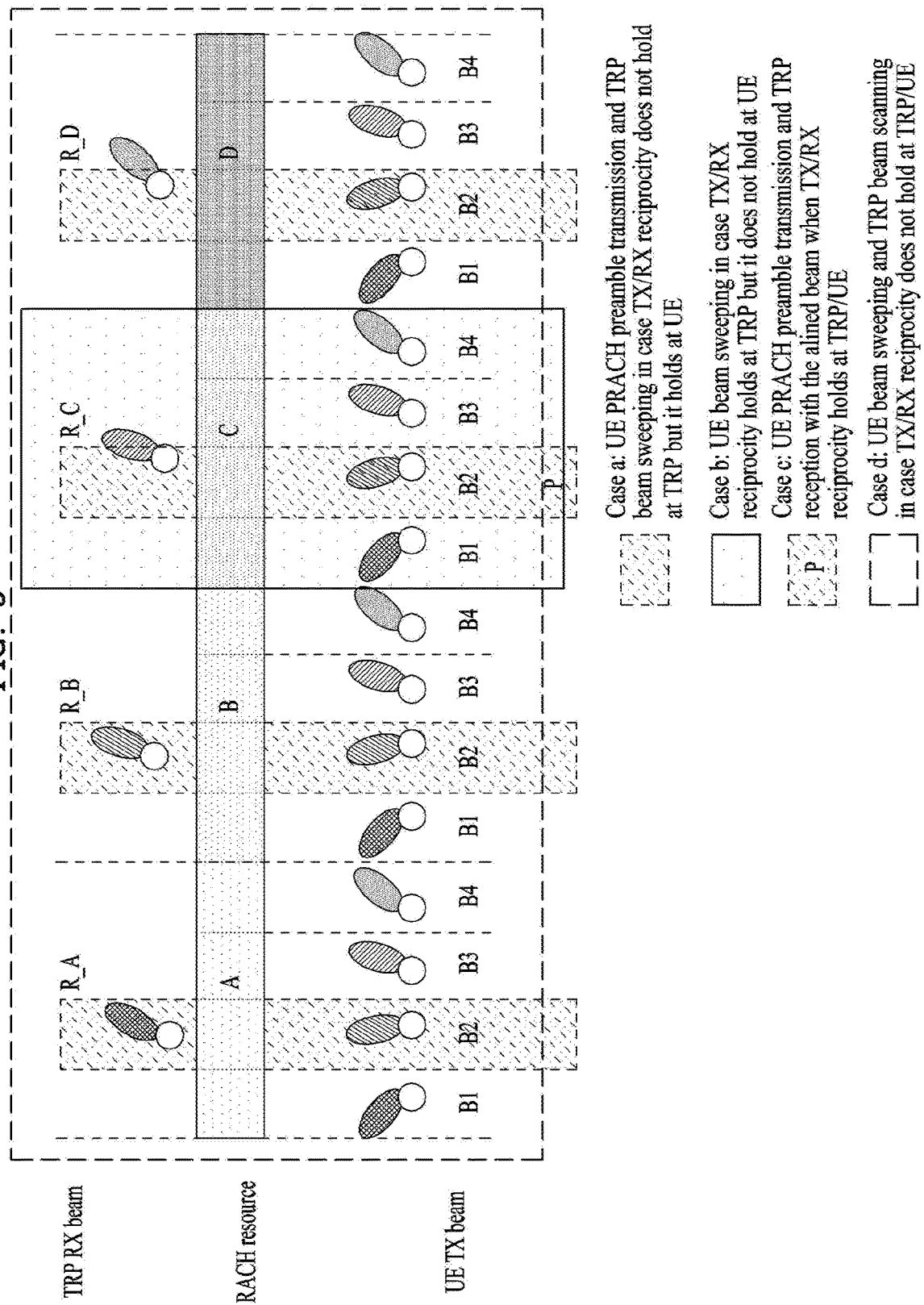
FIG. 9 and FIG. 10 illustrate examples of RACH procedures and beam alignment considering Tx/Rx reciprocity availability according to the present invention.
Figure 10:
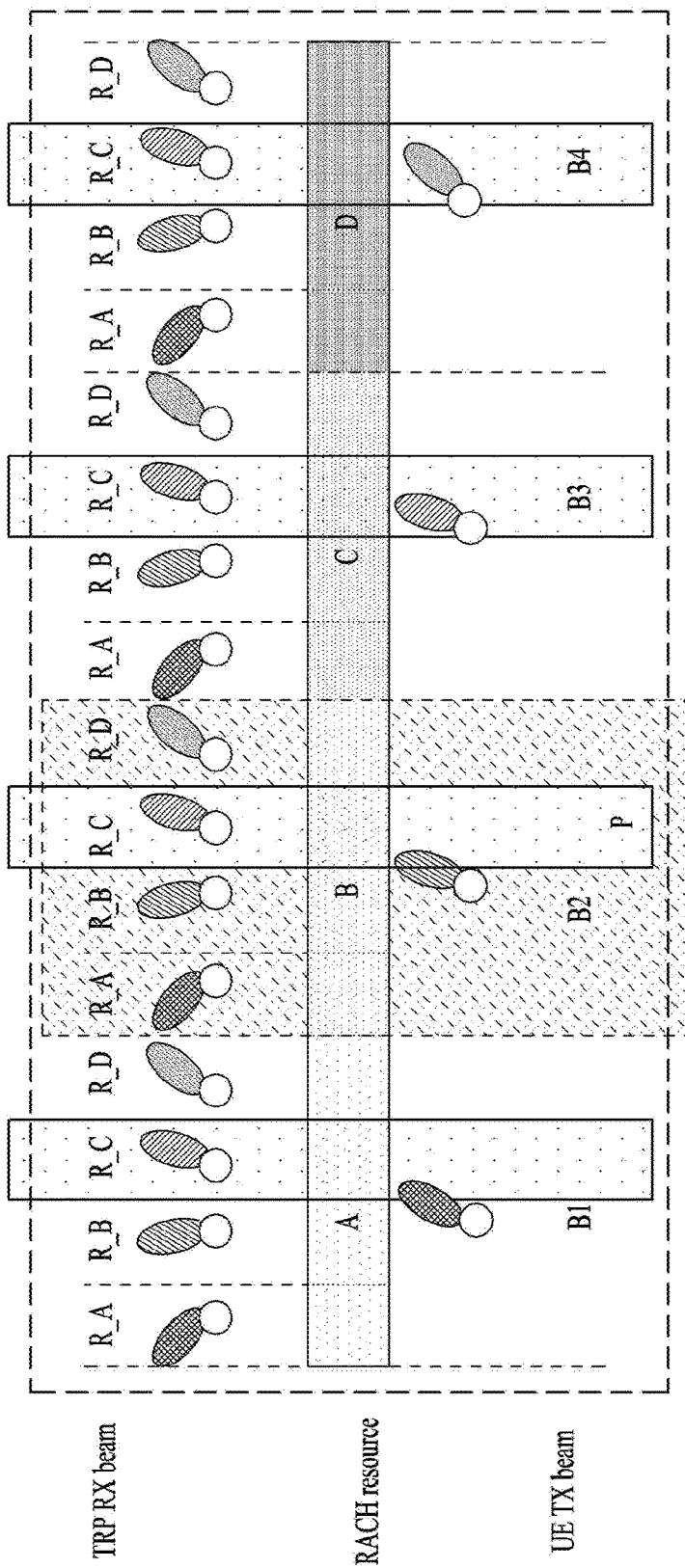

FIG. 9 and FIG. 10 illustrate examples of RACH procedures and beam alignment considering Tx/Rx reciprocity availability according to the present invention. FIG. 9 and FIG. 10 show alternatives of the RACH procedure in relation to a RACH resource, TRP Rx beam and UE Tx beam, assuming 4 Tx/Rx beams at TRP and UE sides, which may not be aligned each other. Different ways of beam alignment depending on the Tx/Rx reciprocity availability at the TRP and the UE are described. FIG. 9 depicts the case that a TRP receiving beam scanning duration is larger than the duration of UE PRACH beam sweeping. On the other hand, FIG. 10 depicts the case that a TRP receiving beam scanning duration is smaller than the duration of UE PRACH beam sweeping.

As shown in FIG. 9 and FIG. 10, if Tx/Rx reciprocity hold at neither a TRP nor a UE, the TRP and the UE has to scan and sweep in exhaustive ways. Depending on different options, PRACH preamble design would be different. As mentioned before, in FIG. 9 and FIG. 10, it is assumed that there are 4 transmission and receiving directions at TRP side and 4 transmission and receiving directions at UE side as well.

A RACH resource is tied to a TRP's receiving direction, and the TRP tunes it receiving beam direction on the given RACH resource accordingly. In FIG. 9, TRP's beam scanning period is larger than the UE's beam sweeping period. In other words, the time duration that the TRP tries to receive UL signals with a specific receiving beam direction is longer than the time duration that the UE tries to transmit UL signals with a specific transmitting beam direction, which can be different than the direction of TRP's receiving beam.

On the other hand, in FIG. 10, TRP's beam scanning period is smaller than the UE's beam sweeping period. In other words, the time duration that the TRP tries to receive UL signals with a specific receiving beam direction is shorter than the time duration that the UE tries to transmit UL signals with a specific transmitting beam direction, which can be different than the direction of TRP's receiving beam.

<RACH Configuration>

The TRP and UE behaviours for PRACH preamble transmissions depending on the Tx/Rx reciprocity, described above, can be summarized as follows:

>If Tx/Rx reciprocity at a TRP and a UE holds, the UE may choose single preamble transmission (Option 1);

>If Tx/Rx reciprocity at a UE does not hold, the UE may transmit multiple preambles with cyclic prefix (CP) and/or guard time (GT) per preamble and possibly different beam directions at the multiple preamble transmissions, i.e., beam sweeping (Option 2), where the preambles may be the same or different. The number of preambles is decided depending on the number of beams to sweep and/or the size of RACH resource(s) (in time domain), otherwise, it can be indicated by the signaling of the number of preamble or preamble format which may include the number of preambles per preamble format;

>If Tx/Rx reciprocity at a TRP does not hold, the UE may chooses repeated preamble transmission with CP/GT only starting and ending, i.e., preamble repetition (Option 3), where beam scanning may be assumed at the TRP;

>RACH resource that is spent for PRAH preamble transmission is increased if Tx/Rx reciprocity does not hold.

In the Option 2, the UE may perform the beam sweeping by transmitting a PRACH preamble in a form of repetition of CP+sequence+GT, or in a form of repetition of CP+sequence, on a RACH resource configured for the beam sweeping, at each Tx beam direction while changing its Tx beam direction. If Tx/Rx reciprocity at the TRP holds, the TRP would tune its Rx beam direction to one direction during UE's beam sweeping period to detect the PRACH preamble of the UE. If Tx/Rx reciprocity at the TRP does not hold, the TRP would perform beam scanning by changing its Rx beam direction to receive the PRACH preamble of the UE.

In the Option 3, if Tx/Rx reciprocity at a TRP does not hold, the UE should transmit a PRACH preamble in a form of CP+repetition of sequence(s)+GT or in a form of CP+repeated sequences, on a RACH resource configured for PRACH preamble repetition, at a Tx beam direction. If Tx/Rx reciprocity at the UE holds, the UE can transmit the PRACH preamble repeatedly at one Tx beam direction corresponding to UE's Rx beam direction from the TRP. If Tx/Rx reciprocity at the UE does not hold, the UE could transmit the form of CP+repeated sequences (+GT) at each Tx beam direction while changing its Tx beam direction.

In the following, a basic unit of RACH resource, RACH preamble format, and RAR related information according to the present invention are described.

Basic Unit of RACH Resource

Figure 11:
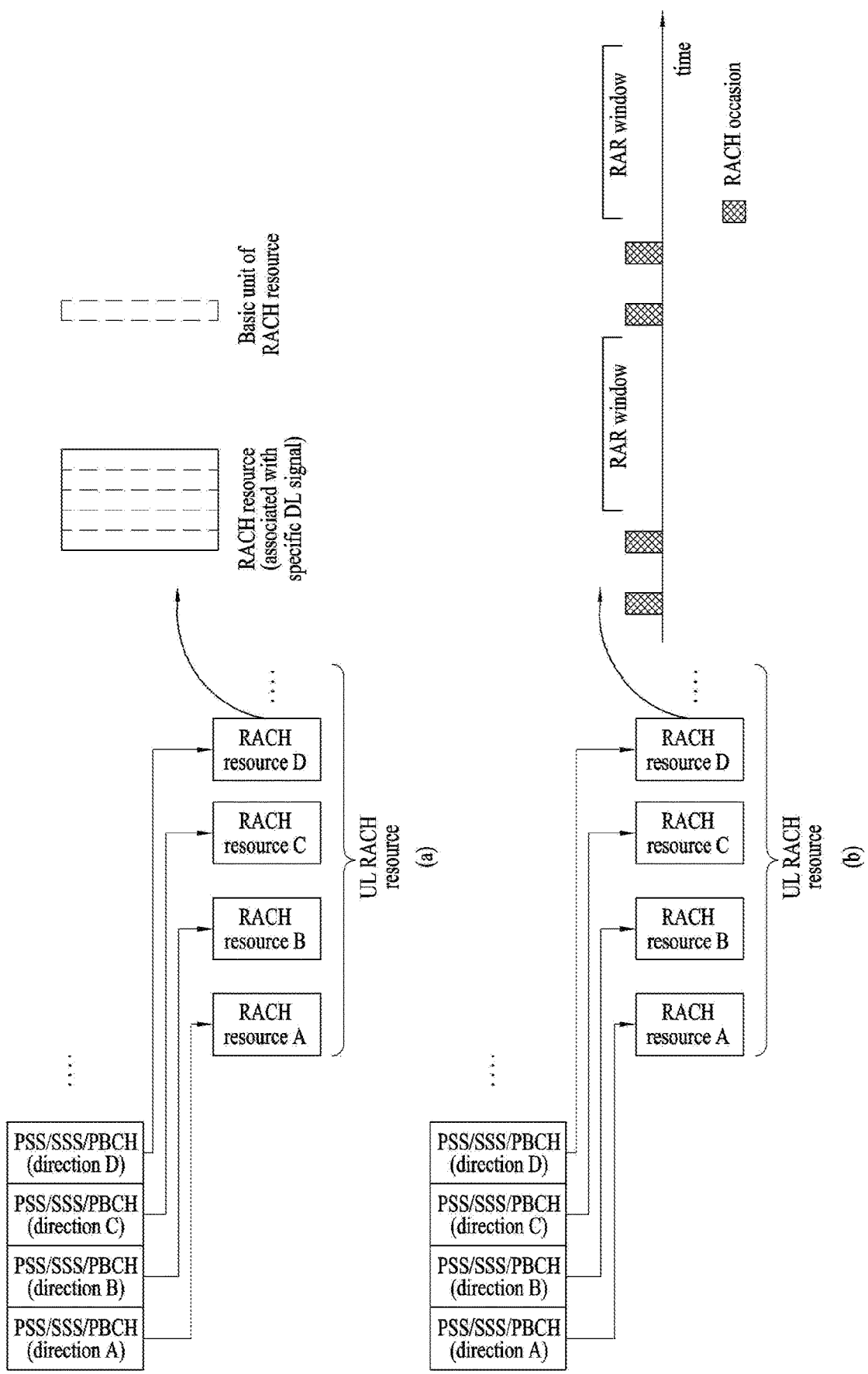
FIG. 11 depicts conceptual diagrams on a RACH resource and a basic unit of the RACH resource.

FIG. 11 depicts conceptual diagrams on a RACH resource and a basic unit of the RACH resource.

A RACH resource is defined as a time-frequency resource for PRACH preamble transmission, possibly in terms of subframes, slots, or mini-slots in time domain and M kHz (M>0) in frequency domain.

Referring to FIG. 11(a), multiple RACH basic units can be defined within a RACH resource. In other words, one RACH resource can be partitioned into multiple RACH basic units. A RACH basic unit is defined as a basic amount of resource on which a single PRACH preamble can be transmitted. Here, a RACH basic unit in time domain may indicate RACH symbol(s) or RACH OFDM symbol(s) that a single PRACH preamble may span in the time domain possibly including a CP and a GT. A RACH resource can be partitioned into multiple RACH basic units, and the RACH resource at least in time domain can be partitioned into multiple RACH basic units.

Referring to FIG. 11(b), a RACH resource may be composed by a set of RACH occasion(s), which a PRACH preamble may fit in. A UE may transmit a PRACH preamble at each RACH occasion and there can be single or multiple RACH occasions before RAR widow. For example, referring to FIG. 11(b), a RACH resource D is associated with associated with a PSS/SSS/PBCH direction D, and the RACH resource D may be composed by a set of RACH occasions.

Either of the RACH resource or RACH basic unit can be defined in the NR specification. Various types of RACH resources or RACH basic units can be defined depending on the services, use cases and other purposes, and depending on the RACH resource size. The network can determine and signal the number of repetition or beam sweeping for PRACH preamble transmission.

PRACH Preamble Format

FIG. 12 illustrates examples of PRACH preamble formats according to the present invention. Although each PRACH preamble format shown in FIG. 12 has a cyclic prefix (CP) at the start of it and a guard time (GT) at the end of it, a PRACH preamble format at either the start or end of it can be also used in the present invention.

As mentioned before, a CP length of a PRACH preamble format is determined by the indicated PRACH preamble format (see Table 1, for example), and RACH configuration can provide information on the number of preambles (which can be repetition or beam swept transmission). Based on the preamble format, which mainly includes the CP length $T_{CP}$ and possibly subcarrier spacing of each preamble format, a UE is able to derive a RACH resource size. Or, explicit signaling on the unit of each RACH resource, i.e., a RACH time unit (e.g. slot or mini-slot) can be provided to UEs. Starting position of each RACH resource should be clearly understood by UEs, which can be done by the explicit signaling on the RACH resource size in a time domain or by implicit way. In case multiple RACH resources are consecutive in a time domain, the composition of the consecutive RACH resources should also be aligned with mini-slot(s) or slot(s), which can be different than the unit of each RACH resource as shown in FIG. 12. This is for gNB to able to determine a guard period (GP) length and for UE to start to transmit a PRACH preamble at a specific time instance.

Alternatively, a RACH preamble format is determined based on the CP length and the number of preambles in the format. Multiple of different preambles can be included in one PRACH preamble format, or a single preamble can be included with repetition in one PRACH preamble format. For more clarity, a RACH occasion can be defined as a time-frequency resource which a PRACH preamble format fits in. In other words, a RACH occasion may be a subset of RACH resource. The size of a RACH occasion can be different per RACH resource which is associated with a specific DL channel/signals.

The RACH configuration includes RACH resource configuration. There can be multiple RACH resources per network, per cell or per TRP, and the size and occasions of each RACH resource can also be different. As shown in FIG. 11, each RACH resource is associated with a DL broadcast signal. If the DL broadcast signal is beam-formed to be transmitted, and the associated RACH resource implies a specific beam direction (i.e. specific SS block index) in terms of PRACH preamble transmission at the UE side and reception at the TRP side. The RACH resource configuration includes the size of the RACH resource possibly in terms of RACH basic units (e.g. number (n1) of basic units per RACH resource), occasions and periodicity of the RACH resource occurrence possibly in terms of slots, mini-slot, number of symbols, RACH basic units, or RACH resource size in a time domain. The RACH resource can be interleaved in terms of RACH basic units in the time domain. Otherwise, the RACH resource can be consecutive in time domain. Here, the size of RACH basic unit is decided as "CP+sequence" or "CP+sequence+GP". Equivalently, the RACH basic unit can be understood as a preamble format without repetition and the size can be different per CP length and sequence length.

Based on the RACH resource configuration, a network can signal the PRACH preamble transmission method to a UE, for example, single preamble transmission, preamble repetition, or beam sweeping. The network signals to the UE whether a PRACH preamble should be repeated or not, and whether the PRACH transmission should be beam swept or not. If the network signals to the UE that the PRACH preamble should be repeated, the number (n2) of repetitions per RACH resource should also be signaled. If the network signals to the UE that the PRACH preamble should be beam-swept, the number (n3) of beams that the UE has to sweep for the PRACH preamble transmission per RACH resource should be signaled. Preferably, n2 and n3 should be the same or less than n1 (i.e., RACH resource size in time domain). Otherwise, the number of repetitions or the number of beams to be swept per RACH resource is bounded by the RACH resource size, n1.

If a UE is allowed to transmit a single PRACH preamble on a RACH resource but the resource size is larger than one RACH basic unit (n1>1), the UE can randomly choose a RACH basic unit for its PRACH preamble transmission in a given multiple RACH basic units in the RACH resource.

The values of n1, n2 and n3 can be defined/signaled specifically for a RACH resource. In other words, the values can be different per DL SS block index or RACH resource.

In case the network commands a UE to transmit repeated PRACH preambles or beam-swept multiple PRACH preambles on a given RACH resource, the number (n2) of repetitions of PRACH preamble or the number (n3) of PRACH preambles should be signaled. The value n2 or n3 can be separately signaled in addition to n1. Preferably, the value n2 or n3 should be the same as n1 per RACH resource. In other words, n2 or n3 can be signaled by means of PRACH preamble format indicating the number of repeated/multiple preambles in conjunction with the size of RACH resource, n1.

For a RACH resource, the network should provide UEs with information indicating whether the RACH resource is for the preamble repetition or preamble beam-sweeping. For a RACH resource configured for the preamble repetition (n2≥1), it is assumed that the UE transmission beam is fixed on the RACH resource. In this case, if the RACH resource is configured for PRACH preamble repetition at the UE side and/or if the RACH resource is configured for TRP's Rx beam scanning when beam correspondence does not hold at the TRP side, signaling the number of preamble repetitions implies the number of TRP's Rx beams that the TRP uses for the PRACH preamble reception.

For a RACH resource for the preamble beam sweeping (n3>1), it is assumed that the UE transmission beam can be switched per preamble transmission in a given PRACH preamble format indicating multiple PRACH preamble transmissions. In this case, the signaling the number of beam sweeping implies the number of UE transmission beams that the UE can try for PRACH preamble transmission. This type of RACH resource can be configured for UEs who do not have beam correspondence capability. If a network configures this type of RACH resource indicating that a UE is allowed to switch its transmission beam for a PRACH preamble on the RACH resource and if a UE having the beam correspondence capability tries to transmit the PRACH preamble on the RACH resource, the UE can randomly choose a RACH basic unit for its PRACH preamble transmission since it has the reciprocal capability. In other words, if a network configures a RACH resource on which a PRACH preamble can be transmitted in a beam sweeping manner, a UE without beam correspondence should transmit its PRACH preamble in a beam sweeping manner The number of beams to be switched is confined by the configured number, but a UE with beam correspondence has freedom to select one RACH basic unit to transmit its PRACH preamble or to use all of the RACH basic units (n1) in the RACH resource for its PRACH preamble transmission with transmission beam fixed in order to increase its PRACH preamble detection probability at the gNB side.

RAR Related Information

The RACH configuration may include RAR related information, for example, RAR window, RAR window steps, and indication of possible locations where a RAR message can be delivered. As described above, a RACH resource can be partitioned into RACH basic units. Then, a RAR window can be defined in terms of RACH basic units in order to reduce initial access latency. Hence, a RAR window starts from the end of the RACH resource with potential offset, K, where the resolution of K is a RACH basic unit (i.e. the offset is an integer multiple of RACH basic unit). The length of the RAR widow is in terms of slot or mini-slot, i.e., the RAR window occupies one or more slots or mini-slots.. Within the RAR window, UE tries to detect a RAR blindly, possibly with RA-RNTI targeting a specific beam direction (associated with a RACH resource the UE used) and with narrower time domain unit, i.e. mini-slot. In other words, within the RAR window, UE blindly detects a control channel addressed to a RA-RNTI every mini-slot occurrence.

Since there can be consecutive RACH occasions especially in a time domain and a UE may transmit concurrent PRACH preambles on the different RACH occasions without respect to the reception of a RAR on the previously transmitted PRACH preambles if this behaviour is allowed. Otherwise (i.e., concurrent PRACH preamble transmission before the expiration of a RAR window is not allowed), a UE who already transmitted a PRACH preamble on a specific RACH occasion has to wait to receive a RAR in a given/configured RAR window. For each RACH occasion, a RAR window that a UE has to monitor for RAR reception should be defined. There can be multiple RACH occasions (RACH resources) and corresponding RAR windows in multiple beam operation. Since RACH resources are to be reserved as uplink resource and RAR windows are to be used for downlink resource, a RAR window should be configured with a fixed starting/ending time (based on the RAR window size) instead of sliding window, and a single RAR window per multiple RACH occasions can be configured.

RACH configurations are to be broadcasted to UEs, and the RACH configurations include information on RACH resource(s), PRACH preamble information including a sequence root index, an initial PRACH preamble transmission power, a random access response window, the number of repetitions or beams for PRACH preamble transmission, and etc.

There can be multiple RACH configurations in the network or specification, and each RACH configuration includes components at least listed above.

Possible ways to consider Tx/Rx reciprocity in RACH configurations may be as follows.

>Network provides TRP's Tx/Rx reciprocal capability—whether the TRP has the capability or not.

>Network provides freedom for UEs to choose a single preamble (Option 1, i.e., single PRACH preamble transmission) or multiple preambles (Option 2, i.e., PRACH preamble transmission with beam sweeping) depending on the UE's reciprocal capability. For the support of this operation, a separate RACH resource per UE's reciprocal capability could be configured. For example, the network may configure a RACH resource used for UE(s) having reciprocal capability and a RACH resource used for UE(s) not having reciprocal capability, separately, and transmit information on the RACH resources. If not, i.e., UE's reciprocal capability is not considered in the RACH resource configuration, a UE is not allowed to transmit multiple PRACH preambles at a single PRACH attempt (occasion) (i.e. beam sweeping of PRACH preamble transmission). In other words, a UE is not allowed to transmit a PRACH with beam sweeping, if UE's reciprocal capability is not considered in the RACH resource configuration.

If the network considers various UE's reciprocal capabilities from the PRACH preamble transmission, it might cause inefficiency of the network resource utilization and excessive initial access delay of other UEs who has reciprocal capabilities. Hence, the network should be able to turn off UE's beam sweeping behaviour for PRACH preamble transmission though the UE does not have Tx/Rx reciprocal capability.

On the other hand, if a TRP does not have Tx/Rx reciprocal capability, the network may signal UEs on this, i.e., signal whether the TRP has the capability or not. The information on the Tx/Rx reciprocal capability at TRP side can be implicitly signaled by means of preamble format to be applied for a cell. If the preamble format having sequence repetition is signaled, UE implicitly knows that the TRP does not have Tx/Rx reciprocal capability.

Unless a RACH resource for PRACH preamble beam sweeping is separately configured;

>For those UEs without Tx/Rx reciprocal capability, the maximum number of beams for PRACH preamble transmission is signaled within RACH configuration information. In other words, the number of trials for different beam directions for PRACH preamble transmission should be limited.

>If a TRP has the Tx/Rx reciprocal capability and signals it,

>>Upon reception of this signaling, a UE may choose a single PRACH preamble with a single beam direction and with CP/GP (Option 1) as a PRACH message 1 (i.e. PRACH preamble). A single PRACH preamble may occupy a basic unit of a RACH resource.

>If the TRP does not have the Tx/Rx reciprocal capability and signals it,

>>Upon reception of this signaling, a UE may choose repeated PRACH preambles with a single beam direction and possibly with CP/GP at the starting and/or ending of the repeated preambles (Option 3) if the RACH resource is configured as in FIG. 10. The integer number (N) of repetitions of a preamble per RACH resource should be signaled within a RACH configuration,
>>A set of repeated preambles on a RACH resource is considered as a single RACH attempt or occasion,
>>>Every single preamble occupies a basic unit of a RACH resource. The N-repeated preambles occupying a RACH resource and the number (N) of repetition are signaled within RACH configuration,
>>>A set of basic unit of RACH resource constitutes a RACH resource,
>>>The number of repetitions of a preamble per RACH resource can be implicitly obtained based on the size of RACH resource and a basic unit of RACH resource if the network commands PRACH preamble repetition, i.e. the network signals that the TRP does not have Tx/Rx reciprocal capability.

Only if a RACH resource for PRACH preamble beam sweeping is separately configured,
>It is UE's choice whether the UE selects a RACH resource configured for PRACH preamble beam sweeping depending on its reciprocal capability. If the UE does not have the capability, the UE chooses the RACH resource and transmit PRACH preamble with beam sweeping on it. If the UE does not have the capability, the UE may select a RACH resource configured for a single PRACH transmission (Option 1), and transmit a PRACH preamble format once on the RACH resource and wait for a RAR.
>If TRP has the Tx/Rx reciprocal capability (and signals it), and a UE does not have the capability,
>>The UE may transmit multiple preambles with different beam direction per each preamble on the RACH resource. In other words, the UE may transmit a PRACH preamble format with beam sweeping (Option 2). Each preamble occupies a basic unit of a RACH resource and a number of multiple preambles occupy a RACH resource. Here, a set of multiple preambles on a RACH resource can be interpreted as a single PRACH attempt or occasion,
>>The number of preambles per single PRACH attempt may be signaled within a RACH configuration.
>If a TRP does not have the Tx/Rx reciprocal capability (and signals it), and a UE does not have the capability, either,
>>The UE may be assigned multiple RACH resource, and multiple preambles with different beam direction per each preamble are to be transmitted on each RACH resource by repetition. Similarly, a set of multiple preambles on a RACH resource can be interpreted as a single PRACH attempt or occasion. The number of preamble per single PRACH attempt and the number of repetition (e.g. the number of RACH resources) may be signaled via a RACH configuration. For example, the UE having N transmission beams may transmit a PRACH preamble format with each of the N transmission beams while changing its transmission beam direction on a RACH resource, and then transmitting the PRACH preamble format N times may be considered a single PRACH attempt or occasion.

For example, a network may configure a first PRACH resource for cell coverage extension/enhancement and a second PRACH resource for beam sweeping, separately, and a PRACH preamble format having multiple preamble sequences in it (e.g. FIG. 12(a)) may be transmitted with a single Tx beam direction on the first PRACH resource for cell coverage extension and a PRACH preamble format having one or multiple preamble sequences in it (e.g., FIG. 12(c) or FIG. 12(a)) may be transmitted with beam swept on the second PRACH resource.

In summary, a network or gNB may configure a first RACH resource for a first PRACH preamble format for a UE having Tx/Rx reciprocal capability and a second RACH resource for a second PRACH preamble format for a UE not having Tx/Rx reciprocal capability, and transmit information on the configured RACH resources. The first PRACH preamble format may have a single preamble sequence (if coverage extension is not needed) or multiple preamble sequences (if coverage extension is needed or receiving beam scanning is needed at gNB(TRP) side) in it. Separate first PRACH preamble formats may be configured: one for the first RACH resource where single or repeated PRACH preamble transmission is required and the other for the second RACH resource where beam swept PRACH preamble transmission is required.

If Tx/Rx reciprocity holds at TRP(s), the first PRACH preamble format would have a single preamble sequence (e.g. FIG. 12(c)) when coverage extension is not needed or multiple preamble sequences (e.g. FIG. 12(a)) when coverage extension is needed. If Tx/Rx reciprocity does hold at TRP(s), the first PRACH preamble format would have multiple preamble sequences in it in order to help the TRP(s) to perform beam scanning A network/gNB would configure a PRACH preamble format having multiple consecutive preamble sequences if coverage extension is needed or if Tx/Rx reciprocity does not hold at a TRP, and may configure separate PRACH preamble formats for the first RACH resource the second RACH resource. The second PRACH preamble format which is used on the second RACH resource may be different from the first PRACH preamble format which is used on the first RACH resource. Multiple PRACH preamble formats can be pre-defined in the system, and the network/gNB may inform UE(s) of which PRACH preamble format is used on the corresponding RACH resource. A UE with Tx/Rx reciprocal capability can transmit its RACH preamble in the first PRACH preamble format on the first RACH resource once before a RAR window, and may transmit its RACH preamble in the first PRACH preamble format at next RACH occasion if the UE fails to receive its RAR within the RAR window. A UE without Tx/Rx reciprocal capability can transmit its RACH preamble in the second PRACH preamble format on the second RACH resource while changing its transmission beam directions as one RACH attempt before a RAR window, and may transmit its RACH preamble in the second PRACH preamble format as a next RACH attempt if the UE fails to receive its RAR within the RAR window. A TRP with Tx/Rx reciprocal capability can attempt to detect a PRACH preamble on configured RACH resource(s) while fixing its Rx beam direction, and a TRP without Tx/Rx reciprocal capability may attempt to detect a PRACH preamble on configured RACH resource(s) by changing its Rx beam direction.

RACH Resource Configuration alt. 1

Let's assume that Tx/Rx reciprocity holds at a TRP but it does not hold at a UE. If Tx beam direction R_C is received with best quality, the UE uses RACH resource C corresponding to the beam direction R_C (Case b in FIG. 9). Within the RACH resource C, the UE transmits its PRACH preamble with beam sweeping manner, i.e., with different beam direction at every attempt of PRACH preamble transmission. In this case, the UE has to transmit a short preamble with different beam direction, e.g., B1, B2, B3, and B4, and a CP should be inserted in front of a PRACH preamble whenever the UE changes its beam direction.

If Tx/Rx reciprocity holds at a UE but it does not hold at a TRP, a RACH resource is not tied to a TRP's transmission beam direction, but the RACH resource is tied to a TRP's receiving beam direction. Since the TRP is not able to determine its receiving beam direction based on the report on the DL measurement at the UE side, a TRP needs to perform beam scanning on the UE's beam direction (Case a in FIG. 9). On the other hand, the UE is able to determine its transmission beam direction based on the received DL signal with best quality. In FIG. 9, it is assumed that the UE determine its best received beam direction as B2 and correspondingly the UE can tune its transmission beam direction as B2. Only a TRP is not able to determine its best receiving beam direction on B2 from the UE, and the TRP tries to receive B2 signal by changing its receiving beam direction.

If Tx/Rx reciprocity does not hold at a TRP and a UE, the TRP performs beam scanning for all possible receiving direction(s) and the UE performs beam sweeping for all possible transmitting beam direction(s), as shown as Case d in FIG. 9.

On the other hand, if Tx/Rx reciprocity holds at both TRP and UE, the UE select its RACH resource for PRACH preamble transmission and its transmission direction, and the TRP is able to determine its receiving beam based on its transmission direction. The RACH resource in this case for the UE would be like small box as notated "P" (Case c in FIG. 9).

RACH Resource Configuration alt. 2

The time durations that a TRP and a UE maintain their receiving and/or transmitting beam direction are related with the RACH resource size in a time domain. In this RACH resource configuration alt. 2, each RACH resource is defined relatively small in the time domain assuming TRP's receiving beam is maintained on the specific RACH resource. Based on the DL broadcast signal beam sweeping, UE can determine which beam direction is received with best quality and UE can tune its receiving beam direction based on the DL received signal.

Let's assume that Tx/Rx reciprocity holds at a TRP but it does not hold at a UE. If Tx beam direction R_C is received with best quality, the UE uses RACH resource C corresponding to the beam direction R_C. Within the RACH resource C, the UE transmits its PRACH preamble with beam sweeping manner, i.e., with different beam direction at every trial of PRACH preamble transmission (Case a in FIG. 10). The UE transmits its PRACH preamble maintaining its beam direction and the TRP tries to receive the UE's signal by changing its receiving beam direction. In this case, the UE can transmit a PRACH preamble with repetition without changing its transmission beam direction and UE does not necessarily add CP every preamble repetition.

If Tx/Rx reciprocity holds at a UE but it does not hold at a TRP, a RACH resource is not tied to TRP's transmission beam direction but the RACH resource is tied to TRP's receiving beam direction. Since the TRP is not able to determine its receiving beam direction based on the report on the DL measurement at the UE side, the TRP needs to perform beam scanning on the UE's beam direction. On the other hand, the UE is able to determine its transmission beam direction based on the received DL signal with best quality. In FIG. 10, it is assumed that the UE determine its best received beam direction as B2 and correspondingly the UE can tune its transmission beam direction as B2. Only the TRP is not able to determine its best receiving beam direction on B2 from the UE, and the TRP tries to receive B2 signal by changing its receiving beam direction, as shown as Case a in FIG. 10.

If Tx/Rx reciprocity hold neither at TRP nor UE, the TRP performs beam scanning for all possible receiving direction and the UE performs beam sweeping for all possible transmitting beam direction, as shown as Case d in FIG. 10.

On the other hand, if Tx/Rx reciprocity holds at both TRP and UE, the UE select its RACH resource for PRACH preamble transmission and its transmission direction, and the TRP is able to determine its receiving beam based on its transmission direction. The RACH resource in this case for the UE would be like small box as notated "P" (Case c in FIG. 10).

<RAR Transmission>

When a TRP receives a PRACH preamble successfully, the TRP transmits a RAR. The contents in the RAR may be different per TRP/UE's Tx/Rx reciprocal capability. Cases 1 to 4 have been identified based on the combinations of Tx/Rx reciprocity at TRP and UE sides in the section <Tx/Rx reciprocity>. In the following, "on" denotes that Tx/Rx reciprocity holds, and "off" denotes that Tx/Rx reciprocity does not hold.

* Case 1: TRP(on), UE(on)—No additional signaling in a RAR on the transmission direction for a Msg3 transmission. A UE can choose a direction for a Msg3 transmission upon receiving a RAR.

* Case 2: TRP(on), UE(off)—A RAR indicates a best receiving direction, which indicates UE's transmission direction for a next step, e.g., Msg3. The maximum number of beam directions for PRACH preamble beam sweeping are signaled in a PRACH configuration. A RAR indicates a best received preamble direction or explicitly indicates a preamble index or resource index. The best received preamble direction can be easily indicated based on the RACH resource, the RACH basic unit and the maximum number of beam directions for PRACH preamble beam sweeping with limited signaling overhead.

* Case 3: TRP(off), UE(on)—No additional signaling in a RAR on the transmission direction for Msg3 transmission. A UE can choose a direction for Msg3 transmission upon receiving a RAR.

* Case 4: TRP(off), UE(off)—A RAR indicates a best receiving direction (UE's transmission direction).

Figure 13:
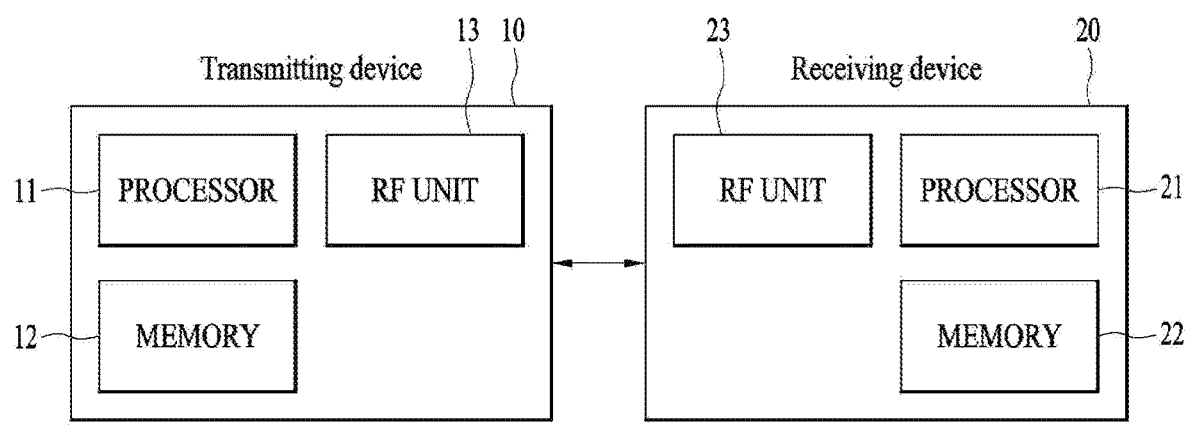
FIG. 13 is a block diagram illustrating elements of a transmitting device 10 and a receiving device 20 for implementing the present invention.

FIG. 13 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where Nt is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

In the present invention, each TRP of an eNB may include a RF unit. Hereinafter, eNB RF unit may denote a RF unit at a TRP of the eNB.

The eNB processor may configure a RACH resource for Option 1, a RACH resource for Option 2 and/or a RACH resource for Option 3, separately. The eNB processor may control the eNB RF unit to transmit RACH configuration information according to the present invention. The eNB processor may control the eNB RF unit to receive a RACH preamble on a RACH resource according to the RACH configuration information.

The UE processor may be configured with RACH resources. The RACH resource for Option 1, a RACH resource for Option 2 and/or a RACH resource for Option 3 may be configured separately according to the present invention. The UE processor may control the UE RF unit to receive RACH configuration information. The UE processor may control the UE RF unit to transmit a RACH preamble using one of RACH resources configured for Option 1, Option 2 and/or Option 3 based on its Tx/Rx beam correspondence.

For example, the eNB processor may control the eNB RF unit to transmit configuration information of a first random access channel (RACH) resource for a first RACH preamble format and configuration information of a second RACH resource for a second RACH preamble format. The eNB processor may control the eNB RF unit to receive a physical RACH (PRACH) with the first RACH preamble format on the first RACH resource or with the second RACH preamble format on the second RACH resource from a user equipment (UE). The eNB processor may control the eNB RF unit to receive the PRACH with the first RACH preamble format on the first RACH resource if transmission (Tx) and reception (Rx) (Tx/Rx) beam correspondence holds at the UE. The processor may control the eNB RF unit to receive the PRACH with second RACH preamble format on the second RACH resource if Tx/Rx beam correspondence does not hold at the UE. The first or second RACH preamble format may have a single preamble sequence, and at least one of a cyclic prefix preceding the single preamble sequence or a guard time following the single preamble sequence. The first or second RACH preamble format may have multiple consecutive preamble sequences, and at least one of a cyclic prefix preceding the multiple consecutive preamble sequences or a guard time following the multiple consecutive preamble sequences.

The UE processor may control the UE RF unit to receive configuration information of a first random access channel (RACH) resource for a first RACH preamble format and configuration information of a second RACH resource for a second RACH preamble format. The UE processor may control the UE RF unit to transmit a physical RACH (PRACH) with the first RACH preamble format on the first RACH resource or with the second RACH preamble format on the second RACH resource. The UE processor may control the UE RF unit to transmit the PRACH with the first RACH preamble format on the first RACH resource if transmission (Tx) and reception (Rx) (Tx/Rx) beam correspondence holds at the UE. The UE processor may control the UE RF unit to transmit the PRACH with second RACH preamble format on the second RACH resource if Tx/Rx beam correspondence does not hold at the UE. The UE processor may control the UE RF unit to transmit the PRACH with the first RACH preamble format on the first RACH resource one time before a random access response (RAR) window if Tx/Rx beam correspondence holds at the UE. The UE processor is configured to control the UE RF unit to transmit the PRACH with the second RACH preamble format on the second RACH resource multiple times before the RAR window if Tx/Rx beam correspondence does not hold at the UE. The processor may control the UE RF unit to transmit the PRACH with the second RACH preamble format multiple times by changing Tx beam directions of the UE on the second RACH resource if Tx/Rx beam correspondence does not hold at the UE. The eNB processor may control the eNB RF unit to attempt to receive the PRACH with one Rx beam direction if Tx/Rx beam correspondence holds at a transmission and reception point (TRP) of the eNB. The eNB processor may control the eNB RF unit to attempt to receive the PRACH by changing Rx beam directions if Tx/Rx beam correspondence holds at a transmission and reception point (TRP) of the eNB.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for transmitting, by a user equipment (UE), random access signals, the method comprising:
   receiving, by the UE from a base station (BS), configuration information of a first random access channel (RACH) resource for a first RACH preamble format and configuration information of a second RACH resource for a second RACH preamble format; and
   transmitting, by the UE to the BS, a physical RACH (PRACH) with the first RACH preamble format on the first RACH resource or with the second RACH preamble format on the second RACH resource,
   wherein the UE transmits the PRACH with the first RACH preamble format on the first RACH resource if transmission (Tx) and reception (Rx) (Tx/Rx) beam correspondence holds at the UE, and the UE transmits the PRACH with second RACH preamble format on the second RACH resource if Tx/Rx beam correspondence does not hold at the UE,
   wherein if the Tx/Rx beam correspondence does not hold at the UE and holds at the BS, the UE transmits the PRACH with the second RACH preamble format by changing Tx beam directions of the UE on the second RACH resource in a form of repetition of a cyclic prefix (CP) and a preamble sequence and a guard time (GT), and
   wherein if the Tx/Rx beam correspondence does not hold at both the UE and the BS, the UE transmits the PRACH with the second RACH preamble format by changing Tx beam directions of the UE on the second RACH resource in a form of the CP and repetition of the preamble sequence and the GT.

2. The method according to claim 1, wherein the UE transmits the PRACH with the first RACH preamble format on the first RACH resource one time before a random access response (RAR) window if the Tx/Rx beam correspondence holds at the UE.

3. A user equipment (UE) for transmitting random access signals, the UE comprising:
   a radio frequency (RF) unit, and
   a processor configured to control the RF unit,
   wherein the processor is further configured to:
      control the RF unit to receive, from a base station (BS), configuration information of a first random access channel (RACH) resource for a first RACH preamble format and configuration information of a second RACH resource for a second RACH preamble format; and
      control the RF unit to transmit, to the BS, a physical RACH (PRACH) with the first RACH preamble format on the first RACH resource or with the second RACH preamble format on the second RACH resource,
   wherein the processor is configured to control the RF unit to transmit the PRACH with the first RACH preamble format on the first RACH resource if transmission (Tx) and reception (Rx) (Tx/Rx) beam correspondence holds at the UE, and the processor is configured to control the RF unit to transmit the PRACH with second RACH preamble format on the second RACH resource if the Tx/Rx beam correspondence does not hold at the UE,
   wherein if the Tx/Rx beam correspondence does not hold at the UE and holds at the BS, the processor is configured to control the RF unit to transmit the PRACH with the second RACH preamble format by changing Tx beam directions of the UE on the second RACH resource in a form of repetition of a cyclic prefix (CP) and a preamble sequence and a guard time (GT), and
   wherein if the Tx/Rx beam correspondence does not hold at both the UE and the BS, the processor is configured to control the RF unit to transmit the PRACH with the second RACH preamble format by changing Tx beam directions of the UE on the second RACH resource in a form of the CP and repetition of the preamble sequence and the GT.

4. The UE according to claim 3, wherein the processor is configured to control the RF unit to transmit the PRACH with the first RACH preamble format on the first RACH resource one time before a random access response (RAR) window if the Tx/Rx beam correspondence holds at the UE.

* * * * *